United States Patent
Wang et al.

(10) Patent No.: US 10,769,387 B2
(45) Date of Patent: Sep. 8, 2020

(54) SYSTEM AND METHOD FOR TRANSLATING CHAT MESSAGES

(71) Applicant: MZ IP Holdings, LLC, Palo Alto, CA (US)

(72) Inventors: Pidong Wang, Mountain View, CA (US); Nikhil Bojja, Mountain View, CA (US); Shiman Guo, Cupertino, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 0 days.

(21) Appl. No.: 16/135,493

(22) Filed: Sep. 19, 2018

(65) Prior Publication Data

US 2019/0087417 A1    Mar. 21, 2019

Related U.S. Application Data

(60) Provisional application No. 62/561,315, filed on Sep. 21, 2017.

(51) Int. Cl.
*G06F 40/58* (2020.01)
*G06F 40/44* (2020.01)
(Continued)

(52) U.S. Cl.
CPC .............. *G06F 40/58* (2020.01); *G06F 40/44* (2020.01); *G06F 40/53* (2020.01); *G06F 40/55* (2020.01); *G06F 40/295* (2020.01)

(58) Field of Classification Search
CPC ........ G06F 17/289; G06F 17/28; G06F 40/58; G06F 40/40; G06F 40/47
See application file for complete search history.

(56) References Cited

U.S. PATENT DOCUMENTS

| 4,460,973 A | 7/1984 | Tanimoto et al. |
| 4,502,128 A | 2/1985 | Okajima et al. |

(Continued)

FOREIGN PATENT DOCUMENTS

| CN | 101414294 A | 4/2009 |
| CN | 101563683 A | 10/2009 |

(Continued)

OTHER PUBLICATIONS

Aw, Ai Ti, and Lian Hau Lee. "Personalized normalization for a multilingual chat system." Proceedings of the ACL 2012 System Demonstrations. Association for Computational Linguistics, 2012. (Year: 2012).*

(Continued)

*Primary Examiner* — Jialong He
(74) *Attorney, Agent, or Firm* — Goodwin Procter LLP

(57) ABSTRACT

Implementations of the present disclosure are directed to a method, a system, and an article for translating chat messages. An example method can include: receiving an electronic text message from a client device of a user; normalizing the electronic text message to generate a normalized text message; tagging at least one phrase in the normalized text message with a marker to generate a tagged text message, the marker indicating that the at least one phrase will be translated using a rule-based system; translating the tagged text message using the rule-based system and a machine translation system to generate an initial translation; and post-processing the initial translation to generate a final translation.

18 Claims, 5 Drawing Sheets

(51) Int. Cl.
  *G06F 40/53* (2020.01)
  *G06F 40/55* (2020.01)
  *G06F 40/295* (2020.01)

(56) References Cited

U.S. PATENT DOCUMENTS

| | | | |
|---|---|---|---|
| 4,706,212 A | 11/1987 | Toma | |
| 5,289,375 A * | 2/1994 | Fukumochi | G06F 17/271 704/2 |
| 5,313,534 A | 5/1994 | Burel | |
| 5,526,259 A | 6/1996 | Kaji | |
| 5,603,031 A | 2/1997 | White et al. | |
| 5,634,084 A * | 5/1997 | Malsheen | G06F 17/273 704/260 |
| 5,873,055 A | 2/1999 | Okunishi | |
| 5,884,246 A | 3/1999 | Boucher et al. | |
| 5,991,710 A | 11/1999 | Papineni et al. | |
| 6,125,362 A | 9/2000 | Elworthy | |
| 6,157,905 A | 12/2000 | Powell | |
| 6,167,369 A | 12/2000 | Schulze | |
| 6,182,029 B1 | 1/2001 | Friedman | |
| 6,278,967 B1 | 8/2001 | Akers et al. | |
| 6,278,969 B1 | 8/2001 | King et al. | |
| 6,285,978 B1 | 9/2001 | Bernth et al. | |
| 6,304,841 B1 | 10/2001 | Berger et al. | |
| 6,415,250 B1 | 7/2002 | van den Akker | |
| 6,425,119 B1 | 7/2002 | Jones et al. | |
| 6,722,989 B1 | 4/2004 | Hayashi | |
| 6,799,303 B2 | 9/2004 | Blumberg | |
| 6,801,190 B1 | 10/2004 | Robinson et al. | |
| 6,848,080 B1 | 1/2005 | Lee et al. | |
| 6,993,473 B2 | 1/2006 | Cartus | |
| 6,996,520 B2 | 2/2006 | Levin | |
| 7,165,019 B1 | 1/2007 | Lee et al. | |
| 7,174,289 B2 | 2/2007 | Sukehiro | |
| 7,451,188 B2 | 11/2008 | Cheung et al. | |
| 7,475,343 B1 | 1/2009 | Mielenhausen | |
| 7,478,033 B2 | 1/2009 | Wu et al. | |
| 7,533,013 B2 | 5/2009 | Marcu | |
| 7,539,619 B1 | 5/2009 | Seligman et al. | |
| 7,822,768 B2 * | 10/2010 | Maymir-Ducharme | G06F 16/313 707/776 |
| 7,890,525 B2 * | 2/2011 | Lu | G06F 16/3343 707/763 |
| 7,895,576 B2 | 2/2011 | Chang et al. | |
| 7,912,852 B1 | 3/2011 | McElroy | |
| 7,970,598 B1 | 6/2011 | Flanagan et al. | |
| 8,010,338 B2 | 8/2011 | Thorn | |
| 8,010,474 B1 * | 8/2011 | Bill | A63F 13/12 706/46 |
| 8,027,438 B2 | 9/2011 | Daigle et al. | |
| 8,112,497 B1 | 2/2012 | Gougousis et al. | |
| 8,145,472 B2 | 3/2012 | Shore et al. | |
| 8,170,868 B2 | 5/2012 | Gamon et al. | |
| 8,244,567 B2 | 8/2012 | Estill | |
| 8,270,606 B2 | 9/2012 | Caskey et al. | |
| 8,311,800 B1 | 11/2012 | Delaney et al. | |
| 8,326,601 B2 | 12/2012 | Ribeiro et al. | |
| 8,380,488 B1 | 2/2013 | Liu et al. | |
| 8,392,173 B2 | 3/2013 | Davis et al. | |
| 8,401,839 B2 | 3/2013 | Kim et al. | |
| 8,442,813 B1 | 5/2013 | Popat | |
| 8,468,149 B1 | 6/2013 | Lung et al. | |
| 8,473,555 B2 | 6/2013 | Lai et al. | |
| 8,489,388 B2 | 7/2013 | Bonnet et al. | |
| 8,510,328 B1 | 8/2013 | Hatton | |
| 8,533,203 B2 | 9/2013 | Chaudhuri et al. | |
| 8,543,374 B2 | 9/2013 | Dymetman | |
| 8,566,306 B2 | 10/2013 | Jones | |
| 8,606,297 B1 | 12/2013 | Simkhai et al. | |
| 8,606,800 B2 | 12/2013 | Lagad et al. | |
| 8,626,486 B2 | 1/2014 | Och et al. | |
| 8,655,644 B2 | 2/2014 | Kanevsky et al. | |
| 8,671,019 B1 | 3/2014 | Barclay et al. | |
| 8,682,529 B1 | 3/2014 | Church et al. | |
| 8,688,433 B2 | 4/2014 | Davis et al. | |
| 8,688,451 B2 | 4/2014 | Grost et al. | |
| 8,738,355 B2 | 5/2014 | Gupta et al. | |
| 8,739,031 B2 * | 5/2014 | Cheung | G06F 17/241 715/261 |
| 8,762,128 B1 | 6/2014 | Brants et al. | |
| 8,788,259 B1 | 7/2014 | Buryak et al. | |
| 8,818,791 B2 | 8/2014 | Xiao et al. | |
| 8,825,467 B1 | 9/2014 | Chen et al. | |
| 8,825,469 B1 | 9/2014 | Duddu et al. | |
| 8,832,204 B1 | 9/2014 | Gailloux et al. | |
| 8,838,437 B1 | 9/2014 | Buryak et al. | |
| 8,886,518 B1 | 11/2014 | Wang et al. | |
| 8,914,395 B2 | 12/2014 | Jiang | |
| 8,918,308 B2 | 12/2014 | Caskey et al. | |
| 8,928,591 B2 | 1/2015 | Swartz et al. | |
| 8,935,147 B2 | 1/2015 | Stern et al. | |
| 8,990,064 B2 | 3/2015 | Marcu et al. | |
| 8,990,068 B2 | 3/2015 | Orsini et al. | |
| 8,996,352 B2 | 3/2015 | Orsini et al. | |
| 8,996,353 B2 | 3/2015 | Orsini et al. | |
| 8,996,355 B2 | 3/2015 | Orsini et al. | |
| 9,031,828 B2 | 5/2015 | Leydon et al. | |
| 9,031,829 B2 | 5/2015 | Leydon et al. | |
| 9,141,607 B1 | 9/2015 | Lee et al. | |
| 9,231,898 B2 | 1/2016 | Orsini et al. | |
| 9,245,278 B2 | 1/2016 | Orsini et al. | |
| 9,298,703 B2 | 3/2016 | Leydon et al. | |
| 9,336,206 B1 | 5/2016 | Orsini et al. | |
| 9,348,818 B2 * | 5/2016 | Leydon | G06Q 30/0217 |
| 9,372,848 B2 | 6/2016 | Bojja et al. | |
| 9,448,996 B2 | 9/2016 | Orsini et al. | |
| 9,535,896 B2 | 1/2017 | Bojja et al. | |
| 9,600,473 B2 | 3/2017 | Leydon et al. | |
| 9,665,571 B2 | 5/2017 | Leydon et al. | |
| 2001/0020225 A1 | 9/2001 | Zerber | |
| 2001/0029455 A1 | 10/2001 | Chin et al. | |
| 2002/0022954 A1 | 2/2002 | Shimohata et al. | |
| 2002/0029146 A1 | 3/2002 | Nir | |
| 2002/0037767 A1 | 3/2002 | Ebin | |
| 2002/0099744 A1 | 7/2002 | Coden et al. | |
| 2002/0152063 A1 | 10/2002 | Tokieda et al. | |
| 2002/0169592 A1 | 11/2002 | Aityan | |
| 2002/0198699 A1 | 12/2002 | Greene et al. | |
| 2003/0009320 A1 | 1/2003 | Furuta | |
| 2003/0033152 A1 | 2/2003 | Cameron | |
| 2003/0033595 A1 | 2/2003 | Takagi et al. | |
| 2003/0046201 A1 | 3/2003 | Chintalapati et al. | |
| 2003/0101044 A1 | 5/2003 | Krasnov | |
| 2003/0125927 A1 | 7/2003 | Seme | |
| 2003/0176995 A1 | 9/2003 | Sukehiro | |
| 2003/0191626 A1 | 10/2003 | Al-Onaizan et al. | |
| 2004/0030750 A1 | 2/2004 | Moore et al. | |
| 2004/0030781 A1 | 2/2004 | Etesse et al. | |
| 2004/0044517 A1 | 3/2004 | Palmquist | |
| 2004/0093567 A1 | 5/2004 | Schabes et al. | |
| 2004/0102201 A1 | 5/2004 | Levin | |
| 2004/0102956 A1 | 5/2004 | Levin | |
| 2004/0102957 A1 | 5/2004 | Levin | |
| 2004/0158471 A1 | 8/2004 | Davis et al. | |
| 2004/0205671 A1 | 10/2004 | Sukehiro et al. | |
| 2004/0210443 A1 | 10/2004 | Kuhn et al. | |
| 2004/0215647 A1 * | 10/2004 | Farn | G06F 17/2217 |
| 2004/0243409 A1 | 12/2004 | Nakagawa | |
| 2004/0267527 A1 | 12/2004 | Creamer et al. | |
| 2005/0038643 A1 | 2/2005 | Koehn | |
| 2005/0076240 A1 | 4/2005 | Appleman | |
| 2005/0102130 A1 | 5/2005 | Quirk et al. | |
| 2005/0160075 A1 | 7/2005 | Nagahara | |
| 2005/0165642 A1 | 7/2005 | Brouze et al. | |
| 2005/0171758 A1 | 8/2005 | Palmquist | |
| 2005/0197829 A1 | 9/2005 | Okumura | |
| 2005/0209844 A1 | 9/2005 | Wu et al. | |
| 2005/0234702 A1 | 10/2005 | Komiya | |
| 2005/0251384 A1 | 11/2005 | Yang | |
| 2005/0283540 A1 | 12/2005 | Fux et al. | |
| 2005/0288920 A1 | 12/2005 | Green et al. | |
| 2006/0053203 A1 | 3/2006 | Mijatovic | |

(56) References Cited

U.S. PATENT DOCUMENTS

| | | |
|---|---|---|
| 2006/0101021 A1 | 5/2006 | Davis et al. |
| 2006/0133585 A1 | 6/2006 | Daigle et al. |
| 2006/0136223 A1 | 6/2006 | Brun et al. |
| 2006/0167992 A1 | 7/2006 | Cheung et al. |
| 2006/0173839 A1 | 8/2006 | Knepper et al. |
| 2006/0206309 A1 | 9/2006 | Curry et al. |
| 2006/0217955 A1 | 9/2006 | Nagao et al. |
| 2006/0242232 A1 | 10/2006 | Murillo et al. |
| 2006/0247917 A1 | 11/2006 | Fux et al. |
| 2006/0271352 A1 | 11/2006 | Nikitin et al. |
| 2006/0287848 A1 | 12/2006 | Li et al. |
| 2007/0011132 A1 | 1/2007 | Zhou et al. |
| 2007/0011235 A1 | 1/2007 | Mutikainen et al. |
| 2007/0016399 A1 | 1/2007 | Gao et al. |
| 2007/0038758 A1 | 2/2007 | Mu et al. |
| 2007/0050182 A1 | 3/2007 | Sneddon et al. |
| 2007/0077975 A1 | 4/2007 | Warda |
| 2007/0088793 A1 | 4/2007 | Landsman |
| 2007/0124133 A1 | 5/2007 | Wang et al. |
| 2007/0124202 A1 | 5/2007 | Simons |
| 2007/0129935 A1 | 6/2007 | Uchimoto et al. |
| 2007/0130258 A1 | 6/2007 | Almberg |
| 2007/0143410 A1* | 6/2007 | Kraft .......... G06Q 10/107 709/206 |
| 2007/0168450 A1 | 7/2007 | Prajapat et al. |
| 2007/0174045 A1* | 7/2007 | Kao .......... G06F 17/278 704/4 |
| 2007/0218997 A1 | 9/2007 | Cho |
| 2007/0219774 A1 | 9/2007 | Quirk et al. |
| 2007/0219776 A1 | 9/2007 | Gamon et al. |
| 2007/0219777 A1 | 9/2007 | Chu et al. |
| 2007/0294076 A1 | 12/2007 | Shore et al. |
| 2008/0005319 A1 | 1/2008 | Anderholm et al. |
| 2008/0005325 A1 | 1/2008 | Wynn et al. |
| 2008/0052289 A1 | 2/2008 | Kolo et al. |
| 2008/0065369 A1 | 3/2008 | Fux et al. |
| 2008/0097745 A1 | 4/2008 | Bagnato et al. |
| 2008/0097746 A1 | 4/2008 | Tagata et al. |
| 2008/0120374 A1 | 5/2008 | Kawa et al. |
| 2008/0126077 A1 | 5/2008 | Thorn |
| 2008/0147380 A1 | 6/2008 | Barliga et al. |
| 2008/0147408 A1 | 6/2008 | Da Palma et al. |
| 2008/0176655 A1 | 7/2008 | James et al. |
| 2008/0177528 A1 | 7/2008 | Drewes |
| 2008/0183459 A1 | 7/2008 | Simonsen et al. |
| 2008/0208596 A1 | 8/2008 | Heinze |
| 2008/0243834 A1 | 10/2008 | Rieman et al. |
| 2008/0249760 A1 | 10/2008 | Marcu et al. |
| 2008/0270553 A1 | 10/2008 | Mu |
| 2008/0274694 A1 | 11/2008 | Castell et al. |
| 2008/0281577 A1 | 11/2008 | Suzuki |
| 2008/0313534 A1 | 12/2008 | Cheung et al. |
| 2008/0320086 A1 | 12/2008 | Callanan et al. |
| 2009/0011829 A1 | 1/2009 | Yang |
| 2009/0031006 A1 | 1/2009 | Johnson |
| 2009/0049513 A1 | 2/2009 | Root et al. |
| 2009/0055175 A1 | 2/2009 | Terrell, II et al. |
| 2009/0068984 A1 | 3/2009 | Burnett |
| 2009/0100141 A1 | 4/2009 | Kirkland et al. |
| 2009/0106695 A1 | 4/2009 | Perry et al. |
| 2009/0125477 A1 | 5/2009 | Lu et al. |
| 2009/0204400 A1 | 8/2009 | Shields et al. |
| 2009/0204596 A1 | 8/2009 | Brun et al. |
| 2009/0221372 A1 | 9/2009 | Casey et al. |
| 2009/0234635 A1 | 9/2009 | Bhatt et al. |
| 2009/0271212 A1 | 10/2009 | Savjani et al. |
| 2009/0276500 A1 | 11/2009 | Karmarkar |
| 2009/0324005 A1 | 12/2009 | Georgiev et al. |
| 2010/0015581 A1 | 1/2010 | DeLaurentis |
| 2010/0036661 A1 | 2/2010 | Boucher et al. |
| 2010/0088085 A1* | 4/2010 | Jeon .......... G06F 17/2818 704/7 |
| 2010/0099444 A1 | 4/2010 | Coulter et al. |
| 2010/0114559 A1 | 5/2010 | Kim et al. |
| 2010/0138210 A1 | 6/2010 | Seo et al. |
| 2010/0145900 A1 | 6/2010 | Zheng et al. |
| 2010/0179803 A1* | 7/2010 | Sawaf .......... G06F 17/28 704/2 |
| 2010/0180199 A1 | 7/2010 | Wu et al. |
| 2010/0204981 A1 | 8/2010 | Ribeiro et al. |
| 2010/0235751 A1 | 9/2010 | Stewart |
| 2010/0241482 A1 | 9/2010 | Knyphausen et al. |
| 2010/0261534 A1 | 10/2010 | Lee et al. |
| 2010/0268730 A1 | 10/2010 | Kazeoka |
| 2010/0293230 A1 | 11/2010 | Lai et al. |
| 2010/0312545 A1 | 12/2010 | Sites |
| 2010/0324894 A1 | 12/2010 | Potkonjak |
| 2011/0022381 A1 | 1/2011 | Gao et al. |
| 2011/0035210 A1 | 2/2011 | Rosenfeld et al. |
| 2011/0040824 A1 | 2/2011 | Harm |
| 2011/0055233 A1 | 3/2011 | Weber et al. |
| 2011/0066421 A1 | 3/2011 | Lee et al. |
| 2011/0071817 A1 | 3/2011 | Siivola |
| 2011/0077933 A1 | 3/2011 | Miyamoto et al. |
| 2011/0077934 A1 | 3/2011 | Kanevsky et al. |
| 2011/0082683 A1 | 4/2011 | Soricut et al. |
| 2011/0082684 A1 | 4/2011 | Soricut et al. |
| 2011/0098117 A1 | 4/2011 | Tanaka |
| 2011/0184736 A1 | 7/2011 | Slotznick |
| 2011/0191096 A1 | 8/2011 | Sarikaya et al. |
| 2011/0202334 A1 | 8/2011 | Abir |
| 2011/0202344 A1 | 8/2011 | Meyer et al. |
| 2011/0202512 A1* | 8/2011 | Pantanelli .......... G06F 17/2785 707/706 |
| 2011/0213607 A1 | 9/2011 | Onishi |
| 2011/0219084 A1 | 9/2011 | Borra et al. |
| 2011/0238406 A1 | 9/2011 | Chen et al. |
| 2011/0238411 A1 | 9/2011 | Suzuki |
| 2011/0239278 A1 | 9/2011 | Downey et al. |
| 2011/0246881 A1 | 10/2011 | Kushman et al. |
| 2011/0307241 A1 | 12/2011 | Waibel et al. |
| 2011/0307356 A1 | 12/2011 | Wiesinger et al. |
| 2011/0307495 A1 | 12/2011 | Shoshan |
| 2011/0313779 A1 | 12/2011 | Herzog et al. |
| 2011/0320019 A1 | 12/2011 | Lanciani et al. |
| 2012/0072204 A1 | 3/2012 | Nasri et al. |
| 2012/0109631 A1 | 5/2012 | Gopal et al. |
| 2012/0156668 A1 | 6/2012 | Zelin |
| 2012/0173502 A1 | 7/2012 | Kumar et al. |
| 2012/0179449 A1 | 7/2012 | Raskino et al. |
| 2012/0179451 A1 | 7/2012 | Miyamoto et al. |
| 2012/0191445 A1 | 7/2012 | Markman et al. |
| 2012/0209852 A1 | 8/2012 | Dasgupta et al. |
| 2012/0226491 A1 | 9/2012 | Yamazaki et al. |
| 2012/0233191 A1 | 9/2012 | Ramanujam |
| 2012/0240039 A1 | 9/2012 | Walker et al. |
| 2012/0246564 A1 | 9/2012 | Kolo |
| 2012/0253785 A1 | 10/2012 | Hamid et al. |
| 2012/0262296 A1 | 10/2012 | Bezar |
| 2012/0265518 A1 | 10/2012 | Lauder |
| 2012/0277003 A1 | 11/2012 | Eliovits et al. |
| 2012/0290288 A1 | 11/2012 | Ait-Mokhtar |
| 2012/0303355 A1 | 11/2012 | Liu et al. |
| 2013/0006954 A1 | 1/2013 | Nikoulina et al. |
| 2013/0073276 A1 | 3/2013 | Sarikaya et al. |
| 2013/0084976 A1 | 4/2013 | Kumaran et al. |
| 2013/0085747 A1 | 4/2013 | Li et al. |
| 2013/0091429 A1 | 4/2013 | Weng et al. |
| 2013/0096911 A1 | 4/2013 | Beaufort et al. |
| 2013/0103493 A1 | 4/2013 | Gao et al. |
| 2013/0124185 A1 | 5/2013 | Sarr et al. |
| 2013/0124186 A1 | 5/2013 | Donabedian et al. |
| 2013/0130792 A1 | 5/2013 | Crocker et al. |
| 2013/0138428 A1 | 5/2013 | Chandramouli et al. |
| 2013/0144599 A1 | 6/2013 | Davis et al. |
| 2013/0151237 A1 | 6/2013 | Hyde |
| 2013/0173247 A1 | 7/2013 | Hodson |
| 2013/0197896 A1 | 8/2013 | Chalabi et al. |
| 2013/0211821 A1 | 8/2013 | Tseng et al. |
| 2013/0226553 A1 | 8/2013 | Ji |
| 2013/0253834 A1 | 9/2013 | Slusar |
| 2013/0262080 A1* | 10/2013 | Marciano .......... G06F 17/2836 704/3 |
| 2013/0297316 A1 | 11/2013 | Cragun et al. |

(56) References Cited

U.S. PATENT DOCUMENTS

| | | | |
|---|---|---|---|
| 2013/0339859 A1 | 12/2013 | Hardi | |
| 2014/0006003 A1 | 1/2014 | Soricut et al. | |
| 2014/0058807 A1 | 2/2014 | Altberg et al. | |
| 2014/0142917 A1 | 5/2014 | D'Penha | |
| 2014/0163951 A1 | 6/2014 | Nikoulina et al. | |
| 2014/0188453 A1 | 7/2014 | Marcu et al. | |
| 2014/0199975 A1 | 7/2014 | Lou et al. | |
| 2014/0200878 A1 | 7/2014 | Mylonakis et al. | |
| 2014/0208367 A1 | 7/2014 | DeWeese et al. | |
| 2014/0229154 A1* | 8/2014 | Leydon | G06F 17/289 704/2 |
| 2014/0288917 A1* | 9/2014 | Orsini | G06F 17/2854 704/2 |
| 2014/0330760 A1 | 11/2014 | Meier et al. | |
| 2014/0379329 A1 | 12/2014 | Dong et al. | |
| 2015/0006148 A1 | 1/2015 | Goldszmit et al. | |
| 2015/0088511 A1 | 3/2015 | Bharadwaj et al. | |
| 2015/0127322 A1 | 5/2015 | Clark | |
| 2015/0161104 A1 | 6/2015 | Buryak et al. | |
| 2015/0161114 A1 | 6/2015 | Buryak et al. | |
| 2015/0161227 A1 | 6/2015 | Buryak et al. | |
| 2015/0186355 A1 | 7/2015 | Baldwin et al. | |
| 2015/0199333 A1 | 7/2015 | Nekhay | |
| 2015/0363394 A1 | 12/2015 | Marciano et al. | |
| 2016/0036740 A1 | 2/2016 | Barber et al. | |
| 2016/0125872 A1* | 5/2016 | Golipour | G10L 13/10 704/260 |
| 2016/0179882 A1 | 6/2016 | Glover et al. | |
| 2016/0267070 A1 | 9/2016 | Bojja et al. | |
| 2016/0336008 A1 | 11/2016 | Menezes et al. | |
| 2017/0060835 A1 | 3/2017 | Radford et al. | |
| 2017/0300453 A1 | 10/2017 | Shen et al. | |

FOREIGN PATENT DOCUMENTS

| | | |
|---|---|---|
| CN | 101645269 A | 2/2010 |
| CN | 1819018 B | 4/2012 |
| EP | 1691299 A2 | 8/2006 |
| JP | 2000-194696 A | 7/2000 |
| JP | 2002041432 A | 2/2002 |
| JP | 2003-529845 A | 2/2003 |
| JP | 2003054841 A | 2/2003 |
| JP | 2004-252881 A | 9/2004 |
| JP | 2006-221658 A | 1/2006 |
| JP | 2006-277103 A | 2/2006 |
| JP | 2006-302091 A | 2/2006 |
| JP | 2006350628 A | 12/2006 |
| JP | 2009134344 A | 6/2009 |
| JP | 2009140073 A | 6/2009 |
| JP | 2010-129057 A | 1/2010 |
| JP | 2010152785 A | 7/2010 |
| JP | 2012-103554 A | 1/2012 |
| JP | 2014-519104 A | 3/2014 |
| WO | WO-2009/129315 A1 | 10/2009 |
| WO | WO-2013/133966 A1 | 9/2013 |
| WO | WO-2014/124397 A1 | 8/2014 |

OTHER PUBLICATIONS

Bojja, Nikhil, Arun Nedunchezhian, and Pidong Wang. "Machine translation in mobile games: Augmenting social media text normalization with incentivized feedback." Proceedings of the 15th Machine Translation Summit (MT Users' Track) 2 (2015): 11-16. (Year: 2015).*

U.S. Appl. No. 16/163,941, filed Oct. 18, 2018, System and Methods for Multi-User Multi-Lingual Communications, Leydon et al.

U.S. Appl. No. 15/586,779, filed May 4, 2017, System and Methods for Incentivizing User Feedback for Translation Processing, Leydon et al.

U.S. Appl. No. 15/267,595, filed Sep. 16, 2016, System and Methods for Multi-User Multi-Lingual Communications, Leydon et al.

U.S. Appl. No. 15/857,968, filed Dec. 29, 2016, System and Methods for Multi-User Multi-Lingual Communications, Leydon et al.

U.S. Appl. No. 16/225,659, filed Dec. 19, 2018, System and Methods for Multi-User Multi-Lingual Communications, Orsini et al.

U.S. Appl. No. 16/210,405, filed Dec. 5, 2018, Systems and Methods for Language Detection, Bojja et al.

U.S. Appl. No. 14/990,540, filed Jan. 7, 2016, Named Entity Recognition on Chat Data, Bojja et al.

"Arabic script in Unicode," accessed on the internet at <http://en.wikipedia.org/wiki/Arabic_script_in_Unicode>; downloaded Dec. 22, 2014; 18pgs.

"BLEU," accessed on the internet at: https://en.wikipedia.org/wiki/BLEU; downloaded Dec. 1, 2018; 5 pgs.

"Chromium-compact-language-detector," accessed on the internet at <https://code.googie.com/p/chromium-compact-language-detector/>; downloaded Dec. 22, 2014; 1 pg.

"CJK Unified Ideographs (Unicode block)," accessed on the internet at <http://en.wikipedia.org/wiki/CJK_Unified_Ideographs_(Unicode block)>; downloaded Dec. 22, 2014; 1 pg.

"CJK Unified Ideographs," accessed on the internet at <http://en.wikipedia.org/wiki/CJK_Unified_Ideographs>; downloaded Dec. 22, 2014; 11pgs.

"cld2," accessed on the internet at <https://code.google.com/p/cld2/>; downloaded Dec. 22, 2014; 2pgs.

"Cloud Translation API documentation," accessed on the internet at: <https://cloud.google.com/translate/docs/>; downloaded Dec. 1, 2018; 2 pgs.

"Cyrillic script in Unicode," accessed on the internet at <http://en.wikipedia.org/wiki/Cyrillic_script_in_Unicode>; downloaded Dec. 22, 2014; 22pgs.

"Dakuten and handakuten," accessed on the internet at: https://en.wikipedia.org/wiki/Dakuten_and_handakuten>; downloaded Dec. 1, 2018; 4 pgs.

"Detect Method," accessed on the internet at <http://msdn.microsoft.com/enus/library/ff512411.aspx>; downloaded Dec. 22, 2014; 5pgs.

"GitHub," accessed on the internet at <https://github.com/feedbackmine/language_detector>; downloaded Dec. 22, 2014; 1pg.

"Google Translate API," accessed on the internet at <https://cloud.qooqle.com/translate/v2/using_rest>; downloaded Dec. 22, 2014; 12pgs.

"Language identification," accessed on the internet at <http://en.wikipedia.org/wiki/Language_identification>; downloaded Dec. 22, 2014; 5pgs.

"Languages and Scripts, CLDR Charts," accessed on the internet at <http://www.unicode.org/cldr/charts/latest/supplemental/languages_and_scripts.html>; downloaded Dec. 22, 2014; 23pgs.

"Latin Script in Unicode," accessed on the internet at <http://en.wikipedia.org/wiki/Latin_script_in_Unicode>; downloaded Dec. 22, 2014; 5pgs.

"ldig (Language Detection with Infinity Gram)," accessed on the internet at <https://github.com/shuyo/ldig>; downloaded Dec. 22, 2014; 3pgs.

"Microsoft Translator Text API," accessed on the internet at: https://www.microsoft.com/enus/translator/translatorapi.aspx>; downloaded on Dec. 7, 2018; 6 pgs.

"Mimer SQL Unicode Collation Charts," accessed on the internet at <http://developer.mimer.com/charts/index.html>; downloaded Dec. 22, 2014; 2pgs.

"Multi Core and Parallel Processing," accessed on the internet at stackoverflow.com/questions/1922465/multi-core-and-parallel-processing, published Dec. 17, 2009; downloaded on Jun. 30, 2015; 2pgs.

"Scripts and Languages," accessed on the internet at <http://www.unicode.org/cldr/charts/latest/supplemental/scripts_and_languages.html>; downloaded Dec. 22, 2014; 23pgs.

"Supported Script," accessed on the internet at <http://www.unicode.org/standard/supported.html>; downloaded Dec. 22, 2014; 3pgs.

"Unicode Character Ranges," accessed on the internet at <http://jrgraphix.net/research/unicode_blocks.php>; downloaded Dec. 22, 2014; 1 pg.

(56) References Cited

OTHER PUBLICATIONS

"Uscript.h File Reference," accessed on the internet at <http://icuproject.org/apiref/icu4c/uscript_8h.html>; downloaded Dec. 22, 2014; 34pgs.
Ahmed, B., et al., "Language Identification from Text Using n-gram Based Cumulative Frequency Addition," In Proceedings of Student/Faculty Research Day, CSIS, Pace University; pp. 12.1-12.8; May 2004.
Aikawa et al., "The Impact of Crowdsourcing Post-editing with the Collaborative Translation Framework," JapTAL Oct. 22-24, 2012; LNAI; 7614:1-10.
Ambati et al., "Collaborative Workflow for Crowdsourcing Translation," Proc. of the ACM 2012 conf. on Computer Supported Cooperative Work, ACM; 1191-1194; Feb. 11-15, 2012.
Baldwin, T. and Lui, M., "Language Identification: The Long and the Short of the Matter," In Proceedings of NAACL-HLT; pp. 229-237; Jun. 2010.
Bender, O. et al., "Maximum Entropy Models for Named Entity Recognition," CONLL '03 Proc. of the 7th Conference on Natural language Learning at HLT-NAACL; vol. 4, pp. 148-151; May 31, 2003.
Bergsma, et al., "Language Identification for Creating Language-specific Twitter Collections," In Proceedings of the Second Workshop on Language in Social Media; pp. 65-74; Jun. 2012.
Bontcheva, K., et al., "TwitIE: An Open-Source Information Extraction Pipeline for Microblog Text," Proc. of the Int'l Conference on Recent Advances in Natural Language Processing, ACL; 8pgs; Sep. 5, 2013.
Brown, Ralf D., "Adding Linguistic Knowledge to a Lexical Example-Based Translation System," Proc. of the 8th Int'l Conference on Theoretical and Methodological Issues in Machine Translation (TMI-99); pp. 22-32; Aug. 1999.
Callison-Burch et al., "Creating Speech and Language Data with Amazon's Mechanical Turk", Proceedings of the NAACL HLT 2010 Workshop on Creating Speech and Language Data with Amazon's Mechanical Turk; 1-12, Jun. 6, 2010.
Callison-Burch, C., "Fast, Cheap, and Creative: Evaluating Translation Quality Using Amazon's Mechanical Turk," Proceedings of the 2009 Conference on Empirical Methods in Natural Language Processing, pp. 286-295, Singapore, Aug. 6-7, 2009.
Carter, et al., "Microblog Language Identification: Overcoming the Limitations of Short, Unedited and Idiomatic Text," Language Resources and Evaluation; 47(1): 195-215; Mar. 2013.
Cavnar, W. and Trenkle, J., "N-gram-based Text Categorization," In Proceedings of the Third Symposium on Document Analysis and Information Retrieval; Apr. 1994, 14 pgs.
Ceylan, H. and Kim, Y., "Language Identification of Search Engine Queries," In Proceedings of ACL-IJCNLP; 2:1066-1074; Aug. 2009.
Chang, C. and Lin, C., "LIBSVM: A Library for Support Vector Machines," ACM Transactions on Intelligent Systems and Technology, 2(27):1-39; Apr. 2011.
Chieu, H.L. and Ng, H.T., "Named Entity Recognition with a Maximum Entropy Approach," CONLL '03 Proc. of the 7th Conference on Natural language Learning at HLT-NAACL; vol. 4, pp. 160-163; May 31, 2003.
Ciaramita et al., "Named-Entity Recognition in Novel Domains with External Lexical Knowledge," Proceedings of the NIPS Workshop on Advances in Structured Learning for Text and Speech Processing; Canada; Dec. 9, 2005; abstract, Section 2.
Cunningham, H., et al., "Gate: An Architecture for Development of Robust hlt Applications," ACL '02 Proc. of the 40th Annual Meeting on Association for Computational Linguistics; pp. 168-175; Jul. 6, 2002.
Curran, J.R. and Clark, S., "Language Independent NER using a Maximum Entropy Tagger," CONLL '03 Proc. of the 7th Conference on Natural language Learning at HLT-NAACL; vol. 4, pp. 164-167; May 31, 2003.
Dunning, "Statistical Identification of Language," Computing Research Laboratory, New Mexico State University; Mar. 1994, 31 pgs.
Examiner's Report for Canadian Application No. 2,913,984; Oct. 19, 2016; 5 pgs.
Extended European Search Report of the EPO in EP2954522; Sep. 7, 2016; 7pgs.
Fan, et al., "LIBLINEAR: A Library for Large Linear Classification," Journal of Machine Learning Research; 9:1871-1874; Aug. 2008.
Finkel, J., et al., "Incorporating Non-local Information into Information Extraction Systems by Gibbs Sampling," ACL '05 Proc. of the 43rd Annual Meeting on Association for Computational Linguistics , pp. 363-370; Jun. 25, 2005.
Foster, et al., "#hardtoparse: POS Tagging and Pursing the Twitterverse," In Proceedings of the AAAI Workshop on Analyzing Microtext; Aug. 2011, 7 pgs.
Gottron, T. and Lipka, N., "A Comparison of Language Identification Approaches on Short, Query-style Texts," In Advances in Information Retrieval; pp. 611-614; Mar. 2010.
Grothe, et al., "A Comparative Study on Language Identification Methods," In Proceedings of LREC; pp. 980-985; May 2008.
Hakkinen, J., et al., "N-gram and Decision Tree Based Language Identification for Written Words," Automatic Speech Recognition and Understanding, 2001, ASRU '01, IEEE Workshop, Dec. 9, 2001, pp. 335-338.
Hughes, et al., "Reconsidering Language Identification for Written Language Resources," In Proceedings of LREC; pp. 485-488; May 2006.
Hulin et al., "Applications of Item Response Theory to Analysis of Attitude Scale Translations," American Psychological Association; vol. 67(6); Dec. 1982; 51 pgs.
Int'l Search Report and Written Opinion of the ISA/EP in PCT/US2014/040676; dated May 6, 2015; 16 pgs.
Int'l Search Report and Written Opinion of the ISA/EP in PCT/US2014/061141; dated Jun. 16, 2015; 13pgs.
Int'l Search Report and Written Opinion of the ISA/EP in PCT/US2017/012102; dated Apr. 18, 2017; 14 pgs.
Int'l Search Report and Written Opinion of the ISA/EP in PCT/US2017/054722; dated Jan. 10, 2018; 13 pgs.
Int'l Search Report of the ISA/US in PCT/US2014/015632; dated Jul. 8, 2014; 8 pgs.
Lafferty, J., et al., "Conditional Random Fields: Probabilistic Models for Segmenting and Labeling Sequence Data," ICML '01 Proc. of the Eighteenth International Conference on Machine Learning; pp. 282-289; Jun. 28, 2001.
Little, G., "Turkit: Tools for Iterative Tasks on Mechanical Turk;" IEEE Symposium on Visual Languages and Human-Centric Computing; pp. 252-253; Sep. 20, 2009.
Liu, et al., "A Broad-coverage Normalization System for Social Media Language," In Proceedings of ACL; pp. 1035-1044; Jul. 2012.
Liu, et al., "Recognizing Named Entities in Tweets," In Proceedings of ACL-HLT; 1:359-367; Jun. 2011.
Lui, et al., "Automatic Detection and Language Identification of Multilingual Documents," Transactions of the Association for Computational Linguistics, 2:27-40; Feb. 2014.
Lui, M. and Baldwin, T., "Accurate Language Identification of Twitter Messages," Proceedings of the 5th Workshop on Language Analysis for Social Media (LASM)@ EACL 2014; pp. 17-25; Apr. 26-30, 2014.
Lui, M. and Baldwin, T., "Cross-domain Feature Selection for Language Identification," Proceedings of the 5th International Joint Conference on Natural Language Processing; pp. 553-561; Nov. 8-13, 2011.
Lui, M. and Baldwin, T., "langid.py: An Off-the-shelf Language Identification Tool," Proceedings of the 50th Annual Meeting of the Association for Computational Linguistics; pp. 25-30; Jul. 8-14, 2012.
Minkov, E., et al., "Extracting Personal Names from Email: Applying Named Entity Recognition to Informal Text," HLT '05 Proc. of the Conference on Human Language Technology and Empirical Methods in Natural Language Processing; pp. 443-450; Oct. 6, 2005.

(56) References Cited

OTHER PUBLICATIONS

Monteith, et al., "Turning Bayesian Model Averaging Into Bayesian Model Combination," Proceedings of the International Joint Conference on Neural Networks IJCNN'11; Jul. 31-Aug. 5, 2011; 7pgs.
Och, F.J. and Ney, H., "A Systematic Comparison of Various Statistical Alignment Models," Computational Linguistics; 29(1):19-51; Mar. 1, 2003.
Office Action (Translated) in Japanese Patent Application No. 2017-520499; dated Sep. 11, 2018; 9 pgs.
Office Action (Translated) in Korean Patent Application No. 10-2016-7000062; dated Oct. 14, 2016; 6 pgs.
Okazaki, N., CRFsuite: A Fast Implementation of Conditional Random Fields (CRFs); accessed on the internet at http://www.chokkan.org/software/crfsuite/; downloaded Jan. 8, 2016; Published Jul. 22, 2015; 4pgs.
Papineni, K., et al. "BLEU: A Method for Automatic Evaluation of Machine Translation," Proc. 40th Annual Meeting on Assoc. for Computational Linguistics (ACL); Jul. 2002; pp. 311-318.
Partial Int'l Search Report of the ISA/EP in PCT/US2014/040676; dated Feb. 17, 2015; 5 pgs.
Popovic, et al., "Syntax-oriented Evaluation Measures for Machine Translation Output," Proc. of the Fourth Workshop on Statistical Machine Translation, pp. 29-32, Mar. 30-31, 2009.
Qureshi et al., Collusion Detection and Prevention with Fire+ Trust and Reputation Model, 2010, IEEE, Computer and; Information Technology (CIT), 2010 IEEE 10th International Conference, pp. 2548-2555; Jun. 2010.
Ritter, et al., "Named Entity Recognition in Tweets: An Experimental Study," In Proceedings of EMNLP;pp. 1524-1534; Jul. 2011.
Rouse, M., "Parallel Processing," Search Data Center.com; Mar. 27, 2007; 2pgs.
Sang, E., et al., "Introduction to the CoNLL-2003 Shared Task: Language-independent Named Entity Recognition," CONLL '03 Proc. of the 7th Conference on Natural language Learning at HLT-NAACL; vol. 4, pp. 142-147; May 31, 2003.
Shieber, S.M., and Nelken R.; "Abbreviated Text Input Using Language Modeling." Natural Language Eng; 13(2):165-183; Jun. 2007.
Takaaki, Mizuta, et al., "Language Identification Using Statistical Hypothesis Testing for Similar Languages," IPSJ SIG Technical Reports, JP, Information Processing Society of Japan, Nov. 19, 2008, vol. 2008, No. 113, p. 91-98.
Tromp, E. and Pechenizkiy, M., "Graph-based n-gram Language Identification on Short Texts," In Proceedings of the 20th Machine Learning Conference of Belgium and The Netherlands; May 2011; 8 pgs.
Vatanen, et al., "Language Identification of Short Text Segments with n-gram Models," In Proceedings of LREC; pp. 3423-3430; May 2010.
Vogel, J. and Tresner-Kirsch, D., "Robust Language Identification in Short, Noisy Texts: Improvements to LIGA," In Proceedings of the 3rd International Workshop on Mining Ubiquitous and Social Environments; pp. 1-9; Jul. 2012.
Xia, F. and Lewis, W.D., "Applying NLP Technologies to the Collection and Enrichment of Language Data on the Web to Aid Linguistic Research," Proc. of the EACL 2009 Workshop on Language Tech. and Resources for Cultural Heritage, Social Sciences, Humanities, and Education—LaTech—SHELT&R 2009; pp. 51-59; Mar. 2009.
Zaidan et al., "Crowdsourcing Translation: Professional Quality from Non-Professionals," Proceedings of the 49th Annual Meeting of the Association for Computational Linguistics, pp. 1220-1229, Portland, Oregon, Jun. 19-24, 2011.
Int'l Search Report and Written Opinion of the ISA/EP in PCT/US2018/051646; dated Jan. 4, 2019; 15 pgs.
U.S. Appl. No. 16/540,542, filed Aug. 14, 2019, Systems and Methods for Multi-User Mutli-Lingual Communications.
U.S. Appl. No. 16/432,354, filed Jun. 5, 2019, Systems and Methods for Incentivizing User Feedback for Translation Processing.
U.S. Appl. No. 16/445,929, filed Jun. 19, 2019, Systems and Methods for Multi-User Multi-Lingual Communications.

* cited by examiner

SYSTEM AND METHOD FOR TRANSLATING CHAT MESSAGES

CROSS-REFERENCE TO RELATED APPLICATIONS

This application claims the benefit of U.S. Provisional Patent Application No. 62/561,315, filed Sep. 21, 2017, the entire contents of which are incorporated by reference herein.

BACKGROUND

The present disclosure relates to systems and methods for translating chat messages and, more specifically, for translating chat messages using a rule-based system and/or a machine translation system.

Chat messaging is ubiquitous in the modern world and enables individuals all over the world to communicate with one another through text (e.g., via standard messaging service (SMS), multimedia messaging service (MMS), a web site, browser add-in, networked gaming software, etc.). However, users of chat messaging services or applications can be limited in communication with one another due to language barriers. For instance, User A texting in Language A may find it difficult to communicate with User B texting in Language B. This is especially true in contexts where User A wishes to communicate quickly with User B, such as in multi-player or cooperative gaming or other time-sensitive situations or coordinated efforts.

SUMMARY

Chat messaging can be particularly useful in multiplayer online games (e.g., mobile games, networked gaming software, massively multi-player online (MMO) games, etc.) in which two or more players can exchange chat messages with one another, for example, to communicate strategies and/or coordinate tasks. When two players (also referred to herein as "users") who speak different languages wish to communicate by chat messaging, a translation service (e.g., machine translator, paid human translator, etc.) can be used to translate the messages back and forth. However, there can be a significant disadvantage in time, quality, and/or cost associated with such translation services. The language-barrier problem may be compounded by informal use of language (e.g., slang terms, short-hand, such as "how r u" instead of "how are you?," etc.) that can be difficult for standard translators to understand or decipher, thereby making real-time communication difficult. Thus, an ability to accurately translate messages in real-time or near real-time can greatly enhance a gaming experience, for example, in cooperative gameplay situations in which multi-lingual communications are required.

Disclosed herein are systems and methods for translating chat messages and other text communications between two languages. In some instances, electronic text messages can be tokenized and/or normalized, for example, by removing control characters, adjusting character widths, replace XML characters, etc. The message can then be tagged with a marker to indicate that at least one word or phrase in the message is to be translated using a rule-based system. The message can then be translated using the rule-based system in conjunction with a machine translation system, such as a statistical machine translator and/or a neural machine translator. The resulting translation is then post-processed (e.g., to remove the marker or de-tokenize the message) to generate a final translation.

Advantageously, the systems and methods described herein are able to achieve more efficient, robust, and accurate translations of electronic text messages. In some instances, for example, the systems and methods can achieve real-time translations between Japanese and Korean or other challenging language pairs. Compared to previous approaches, for example, translation accuracy (e.g., based on a BLEU translation accuracy score) can be improved by as much as a factor of about 1.5, a factor of about 2, or more. Additionally or alternatively, translation times or latencies can be reduced by about 25%, about 50%, or more. In specific implementations, the systems and methods can achieve the efficiency and quality required for real-time translations between users in a multiplayer game environment.

In one aspect, the subject matter described in this specification relates to a method. The method includes: receiving an electronic text message from a client device of a user; normalizing the electronic text message to generate a normalized text message; tagging at least one phrase in the normalized text message with a marker to generate a tagged text message, the marker indicating that the at least one phrase will be translated using a rule-based system; translating the tagged text message using the rule-based system and a machine translation system to generate an initial translation; and post-processing the initial translation to generate a final translation.

In certain examples, the receiving the electronic text message includes splitting the electronic text message into discrete sentences. Normalizing the electronic text message can include at least one of: converting a control character into a space; converting a full-width character into a half-width character; converting a half-width character into a full-width character; converting a UNICODE space character into an ASCII space character; converting a Japanese character with Dakuten or Handakuten from a two-UNICODE point representation to a one-UNICODE point representation; replacing an XML related character; and replacing a special character utilized by the machine translation system.

In some implementations, the normalized message includes characters having a consistent form. The marker can include an XML marker. Tagging the at least one phrase can include tokenizing the normalized text message into discrete words. Tagging the at least one phrase can include converting at least one upper case character in the normalized text message to a lower case character. Translating the tagged text message can include translating the at least one phrase using the rule-based system. The machine translation system can include a statistical machine translator. Post-processing the initial translation can include at least one of: detokenizing the initial translation; removing the marker from the initial translation; and reintroducing into the initial translation a special character used by the machine translation system.

In another aspect, the subject matter described in this specification relates to a system. The system includes one or more computer processors programmed to perform operations including: receiving an electronic text message from a client device of a user; normalizing the electronic text message to generate a normalized text message; tagging at least one phrase in the normalized text message with a marker to generate a tagged text message, the marker indicating that the at least one phrase will be translated using a rule-based system; translating the tagged text message using the rule-based system and a machine translation system to generate an initial translation; and post-processing the initial translation to generate a final translation.

In certain examples, receiving the electronic text message includes splitting the electronic text message into discrete sentences. Normalizing the electronic text message can include at least one of: converting a control character into a space; converting a full-width character into a half-width character; converting a half-width character into a full-width character; converting a UNICODE space character into an ASCII space character; converting a Japanese character with Dakuten or Handakuten from a two-UNICODE point representation to a one-UNICODE point representation; replacing an XML, related character; and replacing a special character utilized by the machine translation system.

In some implementations, the normalized message includes characters having a consistent form. Tagging the at least one phrase can include tokenizing the normalized text message into discrete words. Tagging the at least one phrase can include converting at least one upper case character in the normalized text message to a lower case character. Translating the tagged text message can include translating the at least one phrase using the rule-based system. The machine translation system can include a statistical machine translator. Post-processing the initial translation can include at least one of: detokenizing the initial translation; removing the marker from the initial translation; and reintroducing into the initial translation a special character used by the machine translation system.

In another aspect, the subject matter described in this specification relates to an article. The article includes a non-transitory computer-readable medium having instructions stored thereon that, when executed by one or more computer processors, cause the computer processors to perform operations including: receiving an electronic text message from a client device of a user; normalizing the electronic text message to generate a normalized text message; tagging at least one phrase in the normalized text message with a marker to generate a tagged text message, the marker indicating that the at least one phrase will be translated using a rule-based system; translating the tagged text message using the rule-based system and a machine translation system to generate an initial translation; and post-processing the initial translation to generate a final translation.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

DETAILED DESCRIPTION

In various implementations, the subject matter of this disclosure relates to systems and methods for translating chat messages and other electronic text messages. Specifically, the systems and methods utilize a rule-based system and/or a machine translation system to translate messages between language pairs (e.g., Japanese-Korean, English-German, Russian-English, etc.). Moreover, the exemplary translation systems and methods described herein are configured to achieve greater translation quality for the chat messaging domain, for example, as compared to other available services, such as GOOGLE or MICROSOFT, which generally do not specialize in any one domain and can have low accuracy with chat messages. Chat messaging, as described above, is unique for its use of informal words and grammar, which can present a challenge for conventional translation services. Although the following description provides specific examples for the Japanese-Korean language pair, it is understood that the systems and methods described herein can be applied to any language pair.

Figure 1:
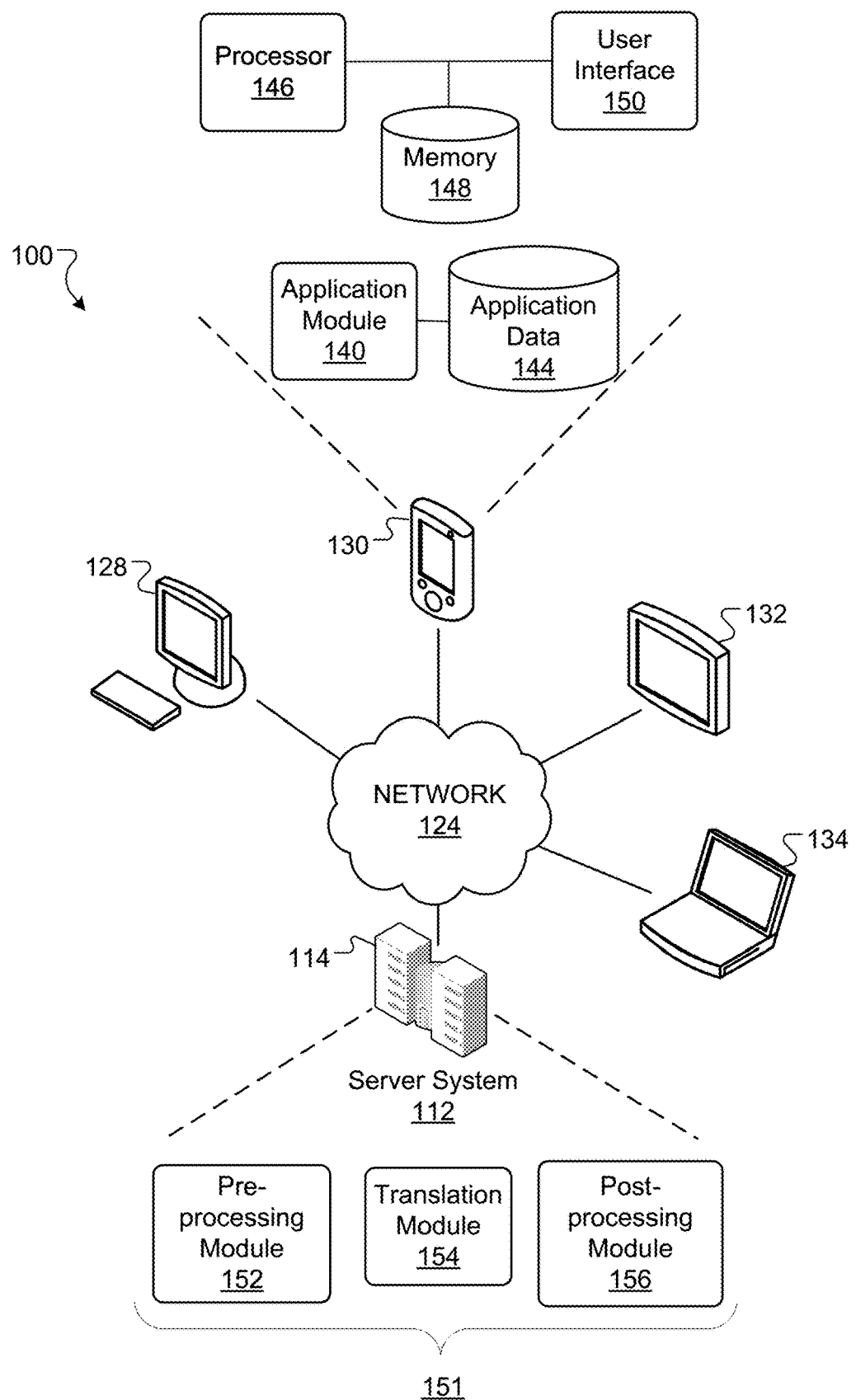
FIG. 1 is a schematic diagram of an example system for translating chat messages.

FIG. 1 illustrates an example system 100 for translating and distributing electronic text messages, including chat messages. A server system 112 provides functionality for pre-processing, translating, and post-processing the text messages. The server system 112 includes software components and databases that can be deployed at one or more data centers 114 in one or more geographical locations, for example. The server system 112 software components can include a pre-processing module 152, a translation module 154, and a post-processing module 156, and/or can include subcomponents that can execute on the same or on different individual data processing apparatus. In general, the pre-processing module 152 can receive an initial text message (e.g., from a client device) and perform certain pre-processing steps on the initial message, for example, to transform the initial message into a more suitable form for translation. The pre-processed message can then be translated into a different language using the translation module 154. The post-processing module 156 can perform certain post-processing steps on the translated message, for example, to transform the translated message into a better, more readable form in the different language. Additionally or alternatively, the server system 112 can include one or more databases (not shown) that can store data used or generated by the pre-processing module 152, the translation module 154, and/or the post-processing module 156. Such data can be or include, for example, training data (e.g., parallel corpora) for a machine translator, training data for domain adaptation, a record of messages and corresponding translations, user data, and/or application data. Other types of data can be included. The databases can reside in one or more physical storage systems and can be accessed by the pre-processing module 152, the translation module 154, and/or the post-processing module 156. The software components and data will be further described below.

An application, such as, for example, a web-based or other software application can be provided as an end-user application to allow users to interact with the server system 112. The application can include a messaging application (via short message service (SMS), multimedia message service (MMS), etc.), web-based application, a browser add-in, etc. The software application or components thereof can be accessed through a network 124 (e.g., the Internet) by users of client devices, such as a personal computer 128, a smart phone 130, a tablet computer 132, and a laptop computer 134. Other client devices are possible. In alternative examples, the modules used by the messaging application, or any portions thereof, can be stored on one or more client devices. Additionally or alternatively, software components for system 100 or any portions thereof can reside on or be used to perform operations on one or more client devices.

Each client device in the system 100 can utilize or include software components and databases for the software application. The software components on the client devices can include an application module 140, which can implement the software application on each client device. The databases on the client devices can include an application data 144 database, which can store data for the software application and exchange the data with the application module 140. The data stored on the application data 144 database can include, for example, translated messages, data structures, one or more dictionaries, etc. While the application module 140 and the application data 144 database are depicted as being associated with the smart phone 130, it is understood that other client devices (e.g., the personal computer 128, the tablet computer 132, and/or the laptop computer 134) can include the application module 140, the application data 144 database, and any portions thereof. Each client device 128, 130, 132, 134 can include interconnected components such as one or more processors 146, one or more memory units 148, and a user interface 150. These interconnected components can be in communication with the application module 140 and/or the application data 144 database.

FIG. 1 illustrates translation system 151 (including pre-processing module 152, translation module 154, and post-processing module 156) as being part of, or coupled to, server system 112. However, it is understood that translation system 151 or any portion thereof can be part of, or coupled to, one or more of the client devices 128, 130, 132, 134. Further, the translation system 151 can be split between the server system and any one or more client devices, so that processing steps for the translation system 151 can be performed on the server system 112 and/or on any client device. For example, the method steps for translating and processing text messages can be performed by the server system 112, one or more client devices, or some combination of the server system and the client device(s).

Figure 2:
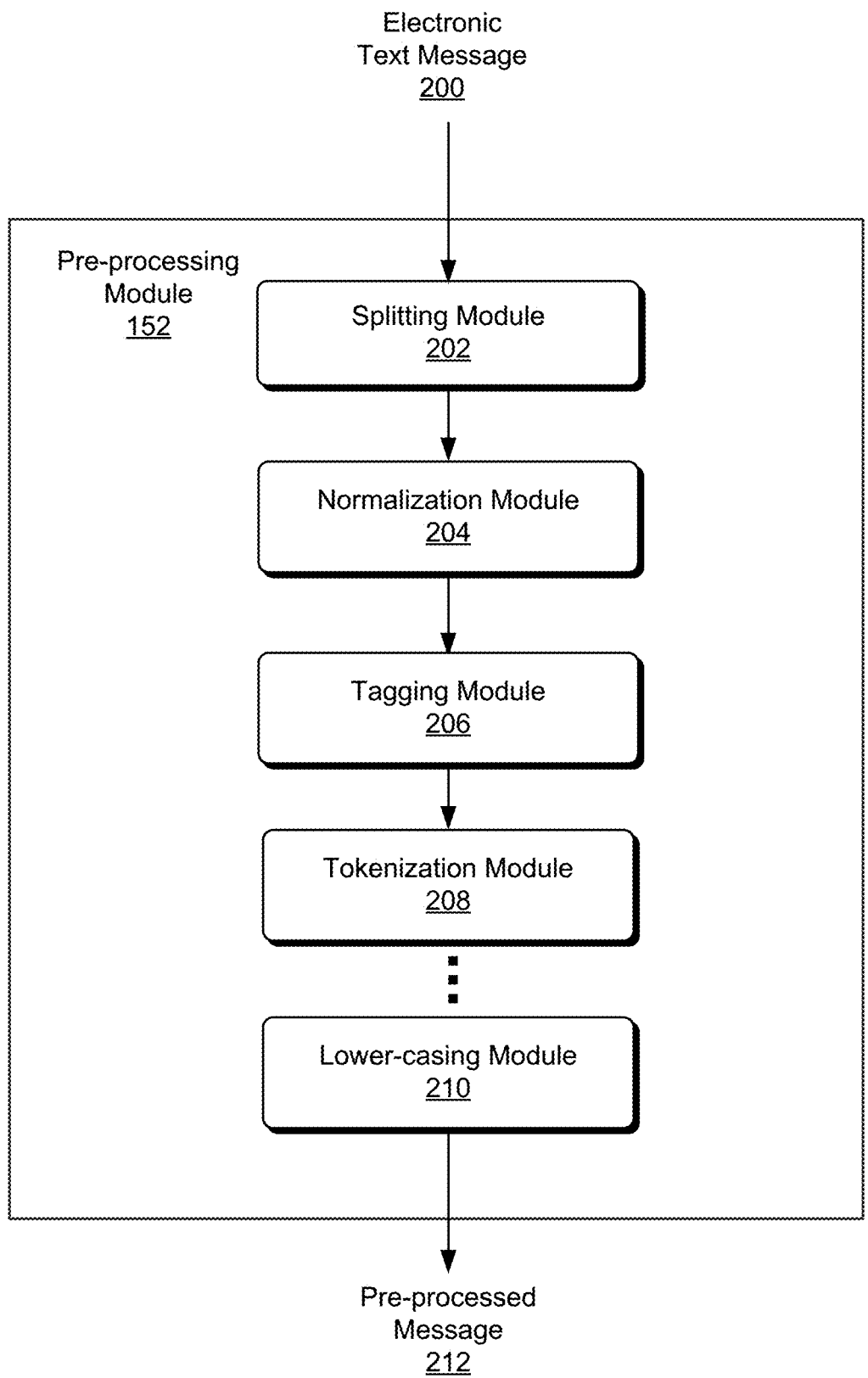
FIG. 2 is a schematic diagram of an example pre-processing module for pre-processing chat messages.

FIG. 2 is a schematic diagram of the pre-processing module 152 for pre-processing an electronic text message 200. The pre-processing module 152 can include a splitting module 202, a normalization module 204, a tagging module 206, a tokenization module 208, and/or a lower-casing module 210. Other modules can be included. The pre-processing module 152 receives the electronic text message 200 from a client device of a user. As an example initial step, if two or more sentences are detected in the received electronic text message (e.g., by detecting periods, etc.), the splitting module 202 can split the electronic text message 200 into the two or more detected sentences. For example, a Japanese text message received by translation system 151 from a user named "Assibal" can be split as follows:

Received Japanese Message:
 Assibal <- こいつ座標 知りたいな。今日は30タイルは占拠しました。
Split Japanese Message:
 Sentence 1: Assibal <- こいつ座標 知りたいな。
 Sentence 2: 今日は30タイルは占 拠しました。

In the example pre-processing module 152, each sentence of the split electronic text message can be provided as input to the normalization module 204, which can normalize the electronic text message or each sentence of the text message. Normalization can include, for example, any one or more of the following processing steps:
 (i) converting a control character into a space;
 (ii) converting a full-width character into a half-width character;
 (iii) converting a half-width character into a full-width character;
 (iv) converting a UNICODE space character into an ASCII space character;
 (v) converting a Japanese character with Dakuten or Handakuten from a two-UNICODE point representation to a one-UNICODE point representation;
 (vi) replacing an XML related character; and/or
 (vii) replacing a special character utilized by the machine translation system.

It is noted that some of the above processing steps (e.g., steps (i), (iv), (vi), and (vii)) can be applicable across all language pairs. Some steps (e.g., (ii) and (iii)) can be applicable for translation to or from languages where non-ASCII characters are used. Such languages can include, for example, Greek, Russian, Chinese, Korean, Japanese, and Arabic. Step (v) can be applicable for translating to or from the Japanese language.

In some implementations, the normalized text message includes characters of a consistent form (e.g., all full-width characters, all half-width characters, etc.). In an exemplary processing step (i), a control character (e.g., a non-printing character, a character that does not represent a written symbol, etc.) in the text message can be converted into a space. In an exemplary processing step (ii), one or more full-width characters (e.g., full-width English letters) can be converted to half-width versions (e.g., half-width English letters). By converting full-width characters to half-width characters in a given sentence, the system can use full-width characters in tags to distinguish tags from the characters in the sentence.

Full-width letters can be converted to half-width versions for several reasons. One reason is to reduce a sparsity of training data for the translator system. Specifically, the existence of both full-width and half-width English letters in the training data can increase the sparsity of the training data. In general, the less sparse the training data, the higher the translation quality that can be achieved by the systems and methods described herein. Another reason is that the half-width versions allow the exemplary tagging module 206 to use tags that are not confused with existing tokens in a given message or request. For example, in the "Tagged Japanese Sentence 2" below, the Japanese characters are the "existing tokens" and "N U M" is the added tag. Otherwise, these confused tokens may result in an incorrect language model score. The language model score is a number calculated based on multiplication of various word sequence probabilities from a given language corpus. An accurate language model score is important to build a grammatically generated sentence in the output language. Thus, the conversion of full-width letters to half-width letters can facilitate the tagging of messages by the tagging module 206 and/or can facilitate the processing of such tags. For example, the exemplary tagging module 206 can use "N U M" as a tag for a number, and the exemplary language model can associate this tag with any given number. If a text message contains "N U M" after the normalization step, however, then the language model could incorrectly process the "N U M" in the request as one or more numbers, resulting in an incorrect translation. This is because "N U M" is a placeholder tag in this context and does not occur naturally in a language corpus.

In an exemplary processing step (iii), a half-width character (e.g., a half-width Japanese character) can be converted into a full-width character (e.g., a full-width Japanese character) to reduce data sparsity of training data to achieve greater translation quality. In an exemplary processing step (iv), UNICODE space characters can be converted to ASCII space characters.

In an exemplary processing step (v), the same Japanese character(s) having Dakuten and Handakuten can have two different UNICODE representations. For example, the first UNICODE representation can have one UNICODE point while the second UNICODE representation can have two UNICODE points. The processing step (v) can convert the two-point version to the one-point version to reduce data sparsity.

In an exemplary processing step (vi), XML-related characters can be replaced or escaped to avoid issues related to inputting characters into translation engines that use XML inputs (e.g., open source translation engine MOSES). An escape character can be one or more characters used to replace or invoke a different interpretation of a character. The following table lists examples of XML-related characters and their respective replacements.

TABLE 1

Examples of XML-related characters with respective replacements.

| XML Character | Replacement |
| --- | --- |
| " | " |
| ' | ' |
| < | < |
| > | > |
| & | & |

In an exemplary processing step (vii), MOSES-sensitive characters (e.g., characters used by MOSES or other translation engines for special purposes that, if not replaced, could adversely affect the translation operations) can be replaced or escaped. For example, a character like a pipe "|" is used internally in the MOSES code to delimit and maintain a phrase table that is used to store various translation hypotheses internal to MOSES's functioning. If such characters are not removed properly from the input to MOSES, it may result in errors in processing, e.g., in which the phrase table delimiter is deemed ineffective within MOSES. Avoiding adverse effects on the operation of MOSES can increase system uptime and/or performance. Thus, processing step (vii) can replace such characters, which can be referred to herein as "special characters." The following table lists examples of MOSES-related, special characters and their respective replacements. Additional special characters may be used, for example, by MOSES or other machine translation systems. When such special characters are present in an untranslated message, it is preferable to replace the special characters with placeholder characters, for example, as shown in Table 2. This can prevent the machine translation system from making decisions or taking actions normally associated with the special characters.

TABLE 2

Examples of MOSES-related characters with respective replacements.

| MOSES-Related Character | Replacement |
| --- | --- |
| \| | | |
| [ | [ |
| ] | ] |

For example, the split Japanese text message from the above example may normalized by the normalization module 204 as follows. Note that the symbol "<" is replaced with "<" in this example.

Un-Normalized Japanese Message:
Sentence 1: Assibal <- こいつ座標知りたいな。
Sentence 2: 今日は30タイルは占拠しました。

Normalized Japanese Message:
Sentence 1: Assibal <こいつ座標 知りたいな。
Sentence 2: 今日は30タイルは占 拠しました。

In general, the normalization module 204 can introduce performance gains and increase translation speed while maintaining high availability in a production environment. A translation system is expected to process hundreds and sometimes thousands of translations per second. For maintaining such a throughput, each module is configured such that it can finish its processing of an input in a timely manner and in a consistent manner so that it does not fail with an error (thus, leading to unavailability). Having minimal errors and processing all inputs without failure ensures high uptime for a deployed translation engine. It is noted that the aforementioned normalization steps can be used as part of the present process for translating between Japanese and Korean chat messages. However, a different sequence of steps (e.g., fewer, additional, and/or alternative steps) may be used by the exemplary systems and methods to perform translations between other languages.

Still referring to FIG. 2, the normalized text from the normalization module 204 can be provided to the tagging module 206, which can add XML or other markers to mark one or more phrases in the text message (e.g., one or more phrases in each sentence of the split text message). The markers can enable a rule-based system to reliably and correctly translate the one or more phrases from a first language to a second language. The rule-based system can include predetermined rules for translating the phrase from the first language to the second language. For example, certain slang words such as "lol" in English can be precisely translated to "mdr" in French. Consequently, certain rules can be framed in which a rule in regular expression notation such as "(.*)lol$" (meaning all inputs with lol at the end) can be set to always add "mdr" at the end of the output when translating between English and French. Words or phrases that are tagged can be translated using a rule-based translator, while other words or phrases that are not tagged can be translated using a separate translator, such as a statistical machine translator or a neural machine translator, as described herein. Such tagging can be particularly useful in chat domains, including chat for gaming, for example, because chat domains can involve many informal named entities that are found in games (e.g., player name, alliance name, kingdom name, etc.). Examples of markers include number tag(s) (e.g., "N U M"), player name tag(s), alliance tag(s), and/or kingdom name tag(s) (e.g., "E N T I T Y"), etc. The names of these informally named entities may also be valid words in other domains (e.g., current events, etc.) and thus, if tags are not used, may be translated (e.g., inadvertently) into other words by a machine translator. The use of tags can allow these names to be retained without translation (as in player name "Assibal" in the example described herein), thereby aiding different players in recognizing the same player names. In some implementations, tagging module 206 can be used to translate numbers more accurately, for example, using rule-based number translation methods, which can further reduce sparsity of numbers. A translation system is trained on a parallel corpus of data. The engine learns the vocabulary of a language through the words present in a corpus. Not all numbers may be uniformly represented in a corpus which may cause an issue of sparsity of tokens. Some numbers may or may not exist in a corpus. For example, at inference, a translation model may encounter a new number and determine the new number to be an out-of-vocabulary word and therefore process it unreliably (e.g., as if the model has never seen the token). However, this number is to be treated as any other number in terms of preserving word order and translation. Hence, the reduction of sparsity is beneficial in avoiding unreliable handling of infrequently processed training data. Referring to the example above, the following is an example of tagging text from a chat message, in which the number "30" is replaced with tag "<ne translation="NUM" entity="30">N U M</ne>," thereby allowing the number to be more accurately translated.

Un-tagged Japanese Sentence 2: 今日は30タイルは占 拠しました。
Tagged Japanese Sentence 2:
今日は <ne translation="NUM" entity="30">N U M</ne> タイルは占 拠しました。

The tagged text from the tagging module 206 can be provided to the tokenization module 208 to produce tokenized text. Specifically, sentences can be tokenized by the tokenization module 208 into discrete words while preserving any markers or tags from previous step(s). Use of the tokenization module 208 can, in some instances, aid in reducing sparsity. In Korean chat messages, for example, users of the messaging service may split a single UNICODE character into multiple UNICODE characters to form an informal word, which can be challenging for translation models to handle. The present systems and methods can address this situation by utilizing suitable rules in the word tokenization step. For example, tokenizing sentences into words can include detecting words in a sentence and inserting spaces between the detected words. Note that the tokenization module 208 can use any suitable type of tokenizer that is configured to work with a given language. For example, open source project MeCab can be used for Japanese word tokenization. The following is an example of tokenizing two sentences from a chat message, in which the resulting words or tokens are separated by spaces.

Un-Tokenized Japanese Text Message:
Sentence 1: Assibal <- こいつ座標 知りたいな。
Sentence 2:
今日は <ne translation="NUM" entity="30">N U M</ne> タイルは占 拠しました。

Tokenized Japanese Text Message:
Sentence 1: assibal <- こいつ 座標 知り たい な 。
Sentence 2:
今日 は <ne translation="NUM" entity="30">N U M</ne> タイル は 占拠 し まし た 。

The tokenized text from the tokenization module 208 can be provided to the lower-casing module 210 to produce a message having lowercase letters and preferably no uppercase letters. Note that, in some implementations, lower-casing can be applied to languages that do not have lowercase letters (e.g., unicameral scripts including Japanese, Korean, etc.) because chat messages in those languages may contain words from languages that do have lowercase letters (e.g., bicameral scripts including Latin-based, Cyrillic-based languages, etc.).

Any one or more of the above pre-processing modules 202, 204, 206, 208, 210 can be used in any combination and/or in any order to produce pre-processed message 212.

Figure 3:
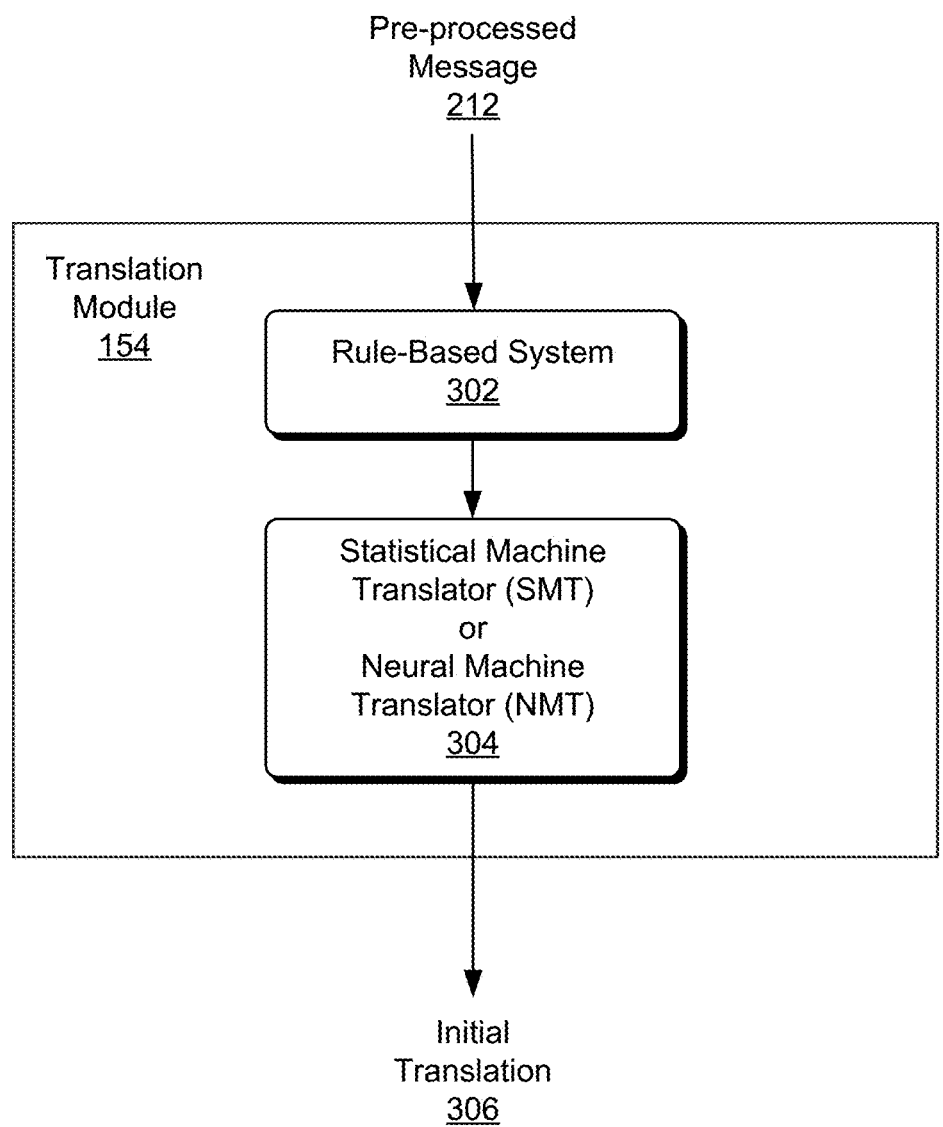
FIG. 3 is a schematic diagram of an example translation module for translating chat messages.

FIG. 3 is a schematic diagram of the translation module 154 for translating the pre-processed message 212 into an initial translation 306. The exemplary translation module 154 can include a rule-based system 302 and machine translator 304. The rule-based system 302 can be used, for example, to translate any portions of messages that have been tagged by the tagging module. In some implementations, the machine translator 304 is a statistical machine translator (SMT), such as a phrase-based decoder based on a "beam-search" algorithm, though other suitable machine translators or decoders can be used. In one example, the machine translator 304 is, includes, or is based on MOSES. An SMT, such as MOSES, can be trained to translate any language pair if provided with sufficient training data on that language pair. The following is an example of a pre-processed message 212, in Japanese, and a corresponding initial translation 306, in Korean, obtained using the translation module 154.

Japanese Pre-Processed Text Message:
Sentence 1: assibal <- こいつ 座標 知り たい な 。
Sentence 2:
今日 は <ne translation="NUM" entity="30">N U M</ne> タイル は 占拠 し まし た 。

Korean Translated Message:
Sentence 1: assibal <- 녀석 좌표 알 고 싶다 .
Sentence 2: 오늘 은 30 타일 점거 했다 .

For purposes of illustration and not limitation, Table 3 lists examples of training data sets that can be used to train one implementation of the MOSES translator, for a French-English language pair.

TABLE 3

Statistics for training data used to train the MOSES translator.

| Id | Description | Language | Min sentence length | Max sentence length | Average sentence length | No. of sentences | No. of unique tokens |
|---|---|---|---|---|---|---|---|
| NC12 | News commentary v12 parallel corpus | French | 1 | 100 | 31.24 | 257328 | 81860 |
| NC12 | News commentary v12 parallel corpus | English | 1 | 100 | 25.35 | 257328 | 84025 |
| TC | Translation corrections | French | 1 | 100 | 7.88 | 24423 | 11725 |

TABLE 3-continued

Statistics for training data used to train the MOSES translator.

| Id | Description | Language | Min sentence length | Max sentence length | Average sentence length | No. of sentences | No. of unique tokens |
|---|---|---|---|---|---|---|---|
| TC | Translation corrections | English | 1 | 100 | 6.17 | 24423 | 11341 |
| NC12-TC | Merged NC12 and TC | n/a | n/a | n/a | n/a | n/a | n/a |
| NC12-EP7 | Merged NC12 and Europarl v7 parallel corpus | n/a | n/a | n/a | n/a | n/a | n/a |
| NC12-EP7-UN1 | Merged NC12, EP7, and United Nations v1 parallel corpus | n/a | n/a | n/a | n/a | n/a | n/a |

In various implementations, the translation module 154 can utilize or include a language model that can evaluate and/or fix any grammar issues in a translation. For example, the language model can determine that the grammar in a translation is incorrect and/or can automatically reorder or revise words or phrases in the translation to achieve proper grammar. Additionally or alternatively, the translation module 154 can include or utilize one or more phrase tables to compare phrases in different language pairs. Forward and backward probabilities for phrases can be used to check translation accuracy, make revisions, and/or refine language or translation models.

Figure 4:
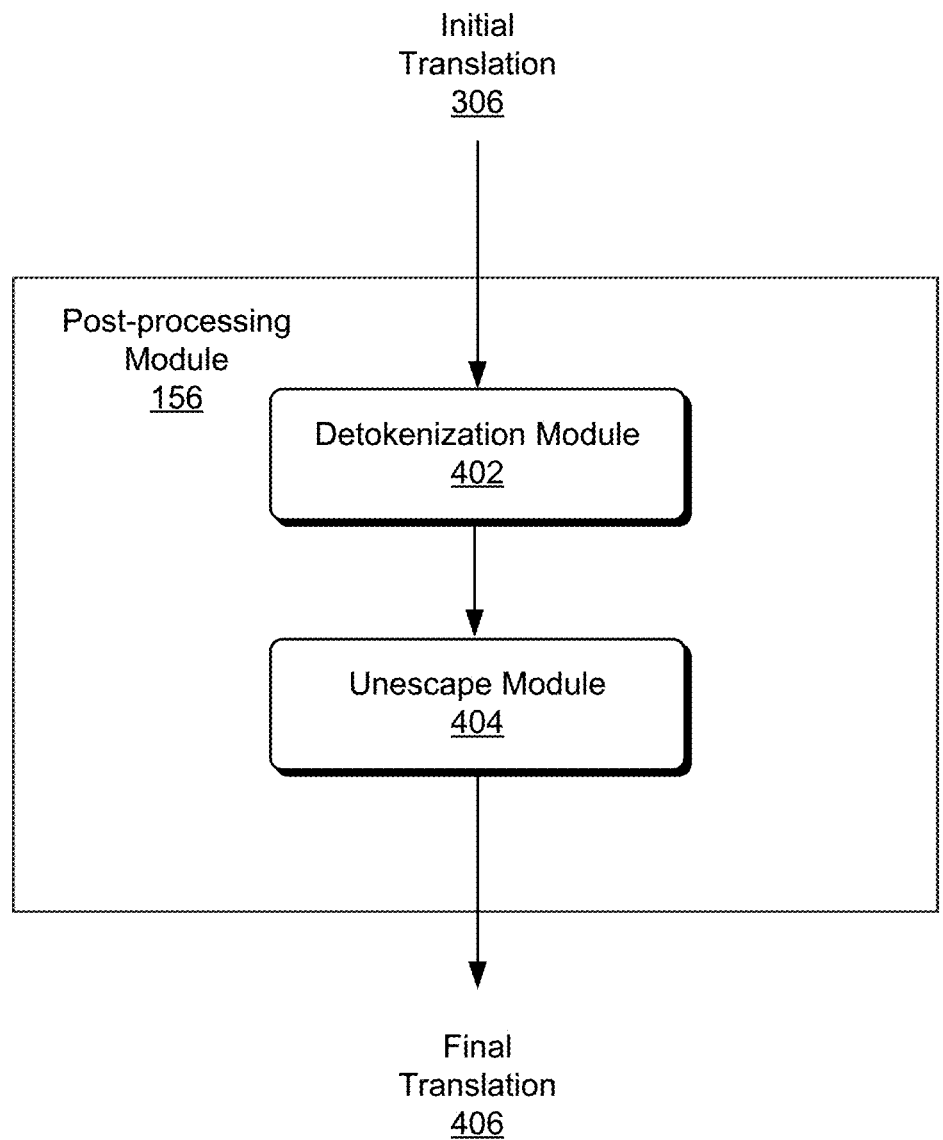
FIG. 4 is a schematic diagram of an example post-processing module for post-processing chat messages.

FIG. 4 is a schematic diagram of the post-processing module 156 for transforming the initial translation 306 into a final translation 406. The post-processing module 156 can include a detokenization module 402, an unescape module 404, and/or other modules for performing the transformations. The detokenization module 402 can combine words or tokens, for example, by removing spaces between words, as illustrated below.

Initial Translation 306:
Sentence 1: assibal <- 녀석  좌표  알 고  싶다 .
Sentence 2: 오늘   은  30  타일  점거  했 다 .
Detokenized Translation:
Sentence 1: <- 녀석  좌표  알고싶다.
Sentence 2: 오늘은 30  타일 점거 했다.

The unescape module 404 can remove escape characters (described herein) and/or replace XML-related characters or MOSES-related characters with conventional characters to produce the final translation 406. The following is an example transformation performed by the unescape module 404.

Detokenized Translation:
Sentence 1: assibal <- 녀석  좌표  알고싶다.
Unescaped Final Translation:
Sentence 1: assibal<- 녀석  좌표  알고싶다.

To evaluate the quality of an exemplary implementation of the systems and methods described herein (which can be referred to as MZ Translator), a BLEU algorithm score can be assigned to translations of a chat message by a GOOGLE translation API, a MICROSOFT translation API, and MZ Translator. The BLEU (an acronym for "bilingual evaluation understudy") metric is considered to be highly correlated to human judgments of translation and is widely used in evaluation of machine translation systems. The BLEU score extends from 0% to 100%, with higher percentage score implying a better translation quality on the same test set. Typically, even a 1% improvement in absolute BLEU score is significant. The below tables demonstrate scores and latencies for translating either from Japanese to Korean (Table 4) or Korean to Japanese (Table 5). Note that the BLEU score is greatest for the MZ Translator as compared to the GOOGLE or MICROSOFT Translation APIs. In some cases, for example, the BLEU score was improved by about a factor of 2.

TABLE 4

Example BLEU scores and latencies for translating a test set of the chat domain from Japanese to Korean by each of the above systems.

| System | BLEU score | Latency (ms/message) |
|---|---|---|
| Microsoft Translation API | 14.55% | 324.824 |
| Google Translation API | 22.82% | 346.379 |
| MZ Translator | 31.43% | 343.425 |

TABLE 5

Example BLEU scores and latencies for a test set of the chat domain from Korean to Japanese by each of the above systems.

| System | BLEU score | Latency (ms/message) |
|---|---|---|
| Microsoft Translation API | 8.00% | 202.438 |
| Google Translation API | 14.39% | 87.728 |
| MZ Translator | 16.33% | 107.75 |

In some implementations, the machine translator 304 can be or include a neural machine translator (NMT) for translating the pre-processed message 212 in the translation module 154. Generally, an NMT can automatically determine or provide an appropriate translation function. An NMT can be trained using a data set including pairs of source sentences (or phrases) of a first language (i.e., a source language) and corresponding translated target sentences (or phrases) of a second language (i.e., target language). Advantageously, in certain examples, use of an NMT can avoid many or all of the pre-processing and/or post-processing steps described herein for statistical machine translators (e.g., MOSES). For example, an initial message from a first user can be provided to the NMT (e.g., with little or no pre-processing) and the translation generated by the NMT can be provided to a second user (e.g., with little or no post-processing). This can greatly improve translation speed and accuracy, once a working and robust NMT has been developed, as described herein.

In some instances, however, an NMT can use some form of tokenization pre-processing, in which words in an initial message can be converted into sub-word units, prior to translation by the NMT. For example, based on statistics or sub-word unit frequencies, the word "unhappy" can be divided into "un," "hap," and "py" sub-word units before being provided as input to the NMT. Any sub-word units in the resulting translation can be combined to form whole words, as needed. The training messages used to develop the NMT can be tokenized into sub-word units in this manner.

To determine an appropriate translation function using an NMT, the following procedure can be employed:
- Collect a large set of training data;
- (ii) Build a neural network;
- (iii) Train the neural network by inputting the training data to the neural network;
- (iv) Obtain the translation function(s) determined by the neural network; and
- (v) Evaluate the neural network once trained.

Typically, a large set of training data (e.g., millions of training data or parallel corpora) can be necessary to properly train the NMT and obtain a proper translation function. This is because a neural network generally includes a large set of "neurons" that, when assembled, create complex functions such as a translation function. Each neuron can be a simple function that takes N number of inputs and provides a scalar value as output. A neuron can include two subunits: (i) a linear subunit that multiplies inputs to the neuron by a weight (e.g., a randomly initialized weight) and (ii) a nonlinear subunit that receives the output of the linear subunit and applies a non-linear computation. The output of the nonlinear subunit in this case is the output of the neuron, which can be classified by the types of non-linear subunits (e.g., sigmoid neuron, relu neuron, tan h neuron, etc.).

Obtaining a large set of training data for NMT can be challenging (e.g., time-consuming and expensive), especially for specialized translation domains, such as the chat domain. Existing training data for NMT typically include or relate to formal language translations from sources such as, for example, newswire, government, official documents, etc. Such communications can be considerably different from chat messages in vocabulary, grammar, and/or formality. In various examples, however, it was found that using a combination of chat domain data with out-of-domain data (such as formal language) as training data did not improve translation, as the more numerous out-of-domain data dominated the NMT training.

In some implementations, an NMT can be configured for the chat domain by performing domain adaptation on existing NMTs (e.g., developed for other domains), such as NEMATUS (developed by the University of Edinburgh in Scotland) or TENSOR2TENSOR (developed by Google), using chat domain-specific training data (e.g., with 10,000 or more chat domain data, 20,000 or more chat domain data, or greater), examples of which are provided below in Tables 6 and 7. In some instances, for example, domain adaptation can involve: (i) retraining an existing NMT to generate a "retrained" or "refined" NMT, (ii) using an ensemble of refined NMTs, and/or (iii) adjusting a refined NMT using a language model. For example, when re-training the NMT to generate a refined NMT, weights applied by the linear subunit, described above, can be automatically adjusted. Adjustment of the weights can enable NMT outputs to be customized for the chat domain. In some implementations, the best weights for a particular instance of the NMT can be determined by evaluating the output and saving the particular instance of the NMT.

TABLE 6

Statistics of training data (with identification MZTC) and test data (with identification MZTS).

| Id | Description | Language | Min sentence length | Max sentence length | Average sentence length | No. of sentences | No. of unique tokens |
|---|---|---|---|---|---|---|---|
| MZTC | used for training English-to-German for refinement | English | 1 | 96 | 6.25 | 32948 | 13022 |
| MZTC | used for training English-to-German for refinement | German | 1 | 103 | 6.92 | 32948 | 16180 |
| MZTC | used for training Russian-to-English for refinement | Russian | 1 | 243 | 5.84 | 23652 | 18275 |
| MZTC | used for training Russian-to-English for refinement | English | 1 | 122 | 6.19 | 23652 | 12389 |
| MZTC | used for training English-to-Russian for refinement | English | 1 | 122 | 6.22 | 23641 | 12379 |
| MZTC | used for training English-to-Russian for refinement | Russian | 1 | 243 | 5.84 | 23641 | 18377 |
| MZTS | used for in-domain and out-of-domain test | English | 1 | 62 | 6.77 | 1026 | 1617 |
| MZTS | used for in-domain and out-of-domain test | German | 1 | 68 | 7.82 | 3078 | 2656 |

TABLE 7

Statistics of tokens in the training data (with identification MZTC) and test data (with identification MZTS).

| Corpus | Language | Number of unique unknown tokens | Total number of unknown tokens |
|---|---|---|---|
| MZTC vs. MZTS | English | 47 | 116 |
| MZTC vs. MZTS | German | 615 | 1563 |

The "MZTC" dataset in Tables 6 and 7 above is used to train and tune the NMT system whereas the "MZTS" is a held-out test set used to measure the accuracy of the trained NMT system. As MZTS is a held-out dataset, it may contain words that were not seen from the training set and hence words that the model is untrained to properly process. Translation performance on these unseen words is typically poor; Table 7 depicts the extent of out-of-vocabulary words for the models (labelled "unknown tokens").

In some embodiments, the training and/or test data can be organized prior to training the NMT, for example, by splitting the data into separate sets based on sentence length and/or word frequency. Regarding sentence length, the data can be categorized into sets of sentences having <15, <50, or <100 characters. The data can be further categorized into sets of 1-15, 16-30, 31-50, 51-80, and 81-100 characters, for example, for curriculum learning of NMT. Regarding word frequency, the data can be categorized into two groups: one with the top N most frequent words and the other with all remaining words. N can be selected based on a number of training data remaining after N is chosen. For example, N can represent the top 5%, 10%, or 20% most frequent words.

In some implementations, domain adaptation of an NMT for the chat domain can involve combining multiple translation models (e.g., multiple retrained or refined NMTs) in an approach referred to herein as "ensemble." The ensemble approach can involve, for example, (i) performing domain adaptation to develop multiple NMT models using different sets of training data and then (ii) using a combination of these NMT models to perform translations. For example, a classifier or other machine learning algorithm can be used to determine a best translation based on a combination of NMT model results. In some instances, for example, the NMT model results can be provided as input to a classifier, and the classifier can provide the best translation as output. In such a case, the classifier can be trained using a set of training data that includes, for example, initial messages, translations provided by multiple NMT models, and accurate or known translations of the initial messages into one or more different languages. In some examples, it was found that greater than 80 training iterations did not significantly improve the score of the translation. Additionally or alternatively, the ensemble approach can use a regression equation or an interpolation to determine a best translation based on a combination of results from multiple NMT models. In some implementations, an ensemble of multiple models can result in better or more accurate translations than a single, refined NMT translator (e.g., developed by performing domain adaptation on a single NMT model).

Tables 8 to 11 provide BLEU scores for the retrained and/or ensemble NMTs. The following is a description of some of the translation systems in Tables 8-11:

The "Chat domain-adapted ens0-1-20-50" model refers to an ensemble NMT system including 4 NMT systems. "ens0" refers to the original NEMATUS model and the remainder ("ens1-20-50") are each trained to 1, 20, and 50 epochs, respectively.

The "Chat domain-adapted ens+ken-lm" refers to a translation system that has an added language model at the end called "KenLM" that is used to rescore and rearrange words in the output in a grammatical manner.

The "Chat domain-adapted ens0-20-50-80" model refers to an ensemble NMT system including the original NEMATUS model ("ens0") and 3 NMT systems each trained to 20, 50, and 80 epochs, respectively.

The "Chat domain-adapted ens0-1-10-20 trained with additional 40 k translation cache" model refers to an ensemble NMT system Including the original NEMATUS model ("ens0") and 3 NMT systems each trained to 1, 10, and 20 epochs, respectively, and augmented with additional training data of forty thousand previously machine-translated sentences.

The "Chat domain-adapted ens10-20-50" model refers to an ensemble NMT system including 3 NMT systems each trained to 10, 20, and 50 epochs, respectively.

TABLE 8

Evaluation of translator systems translating English to German using test data MZTS.

| Translator System | BLEU score |
|---|---|
| GOOGLE Translation API | 41.20% |
| MICROSOFT Translation API | 33.55% |
| Chat Domain-adapted ens0-1-20-50 | 41.83% |
| Chat Domain-adapted ens + ken-lm | 73.01% |
| Chat Domain-adapted TENSOR2TENSOR | 44.96% |

TABLE 9

Evaluation of translator systems translating German to English using test data MZTS.

| Translator System | BLEU score |
|---|---|
| GOOGLE Translation API | 54.93% |
| MICROSOFT Translation API | 58.08% |
| Chat Domain-adapted ens0-20-50-80 | 59.83% |
| Chat Domain-adapted ens + ken-lm | 62.39% |
| Chat Domain-adapted TENSOR2TENSOR | 54.96% |

TABLE 10

Evaluation of translator systems translating Russian to English using test data MZTS.

| Translator System | BLEU score |
|---|---|
| GOOGLE Translation API | 50.54% |
| MICROSOFT Translation API | 43.93% |
| Chat Domain-adapted ens0-1-20-50 | 42.28% |
| Chat Domain-adapted ens0-1-10-20 trained with additional 40k translation cache | 42.92% |
| Chat Domain-adapted ens + ken-lm | 44.40% |

TABLE 11

Evaluation of translator systems translating English to Russian using test data MZTS.

| Translator | BLEU score |
|---|---|
| GOOGLE Translation API | 38.85% |
| MICROSOFT Translation API | 35.16% |

TABLE 11-continued

Evaluation of translator systems translating
English to Russian using test data MZTS.

| Translator | BLEU score |
| --- | --- |
| Chat Domain-adapted ens10-20-50 | 35.10% |
| Chat Domain-adapted ens + ken-lm | 36.86% |

In some implementations, domain adaptation can involve language model adaptation, in which outputs from a retrained NMT are re-scored according to how well the outputs fit a language model (e.g., for the chat domain). For example, a retrained NMT can provide multiple candidate translations for a given input message. The candidate translations can be evaluated with a language model for accuracy (e.g., compliance with grammar rules, agreement with previous messages, etc.). In some instances, for example, an NMT can be configured for the chat domain by evaluating outputs of the retrained NMTs and selecting high-scoring candidates. For example, the outputs of the retrained NMTs can be candidate translated sentences which are re-scored based on the chat domain. These re-scored candidate translated sentences can be selected based on their new scores (e.g., select a top percentage or number of translated sentences). This process can be used to further improve the accuracy of the retrained NMTs (e.g., for the chat domain).

In some implementations, an NMT can be configured for the chat domain by (i) generating a target language model using large chat domain monolingual data and then (ii) integrating the target language model into the decoder of NMT. An output score (e.g., a probability) can be computed by combining the language model score with the decoding score in translation. In an exemplary implementation, a deep fusion method can be used. The deep fusion method can include, for example, separately pre-training (i) an NMT model on in-domain parallel data and (ii) a recurrent language model on a large monolingual target language data. The pre-trained recurrent neural network language model (RNNLM) and decoder of the NMT can be integrated by concatenating hidden states of RNNLM and the hidden states of the decoder. The deep output model can then be fine-tuned to compute the output probability, for example, by updating output parameters to fine-tune the deep output layer. For example, this can improve German-to-English translation over the baseline NMT system by 0.47 points in the BLEU score of German-to-English translation.

In some implementations, an NMT can be configured for the chat domain by generating in-domain synthetic data and using the synthetic data for in-domain training. In order to generate synthetic parallel data, monolingual target language data can be translated to the in-domain source language, and pairs of automatically back-translated data with the monolingual language data can be treated as additional parallel data for in-domain translation. For example, this method can improve the performance of English-German translation by about 3 points in the BLEU score.

In some implementations, an NMT is configured for the chat domain via a dual learning algorithm in which the NMT can learn translation from unlabeled monolingual data. For example, in the learning of a dual task such as French-to-English and English-to-French translation, the primary task can be French-to-English translation and the dual task can be English-to-French translation. A dual mechanism can be assumed to generate informative feedback signals for translation learning. Specifically, there can be two agents: one agent to represent a model for the primary task (e.g., French-to-English translation), and another agent to represent a model for the dual task (e.g., English-to-French translation). Then two agents can teach each other as follows. The primary agent can sample a sentence from French monolingual data, translate the sampled sentence to English, and send the sampled sentence to the dual agent. The dual agent can evaluate the received sentence using its pre-trained English language model without knowing the original sentence. Then the dual agent can return the output likelihood as feedback. The dual agent can translate the received English sentence back to French, for example, and send the result back to the primary agent. The primary agent can compare the returned French sentence and the original French sentence to generate a re-construction score as another feedback. The output model likelihood score and the re-construction can be used together for rewards for policy gradient reinforcement learning. This approach can be repeated, for example, until the translation models for the two agents converge.

Any two or more of the above-described methods and systems for configuring NMTs for the chat domain can be combined to create a chat domain-specific NMT.

Figure 5:
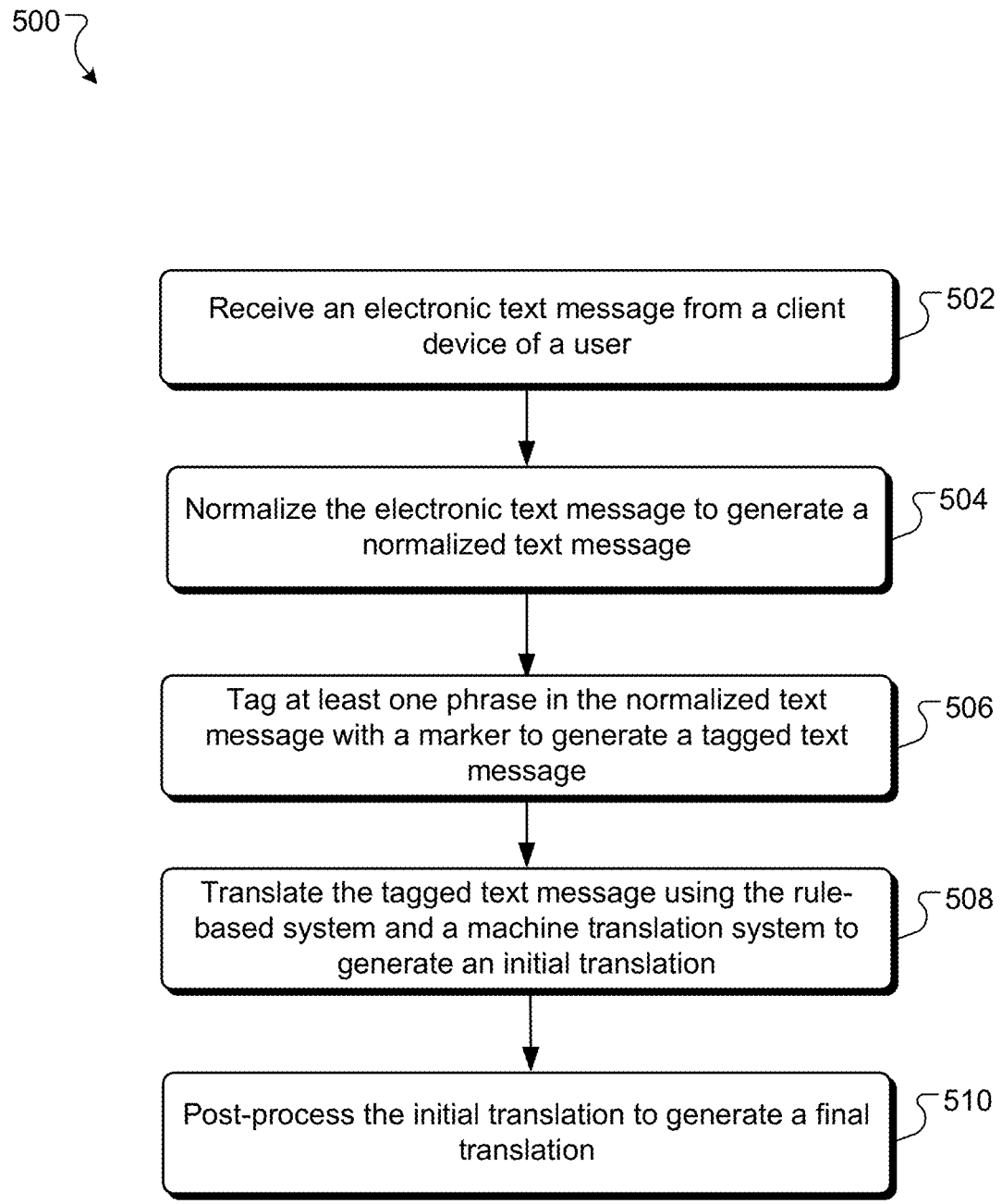
FIG. 5 is a flowchart of an example method for translating chat messages.

FIG. 5 is a flowchart of an example method 500 for translating chat or other messages. In step 502, the translation system 151 receives an electronic text message from a client device of a user. In step 504, the translation system 151 normalizes the electronic text message to generate a normalized text message. In step 506, the translation system 151 tags at least one phrase (e.g., a character, a word, or a combination of characters or words) in the normalized text message with a marker to generate a tagged text message. The marker can indicate that the phrase(s) will be translated using a rule-based system. For example, the pre-processing module 152 of translation system 151 can normalize and/or tag the received electronic text message. In step 508, the translation system 151 translates the tagged text message using the rule-based system and/or a machine translation system to generate an initial translation. For example, the translation module 154 of translation system 151 can translate the tagged text message. In step 510, the translation system 151 post-processes the initial translation to generate a final translation. For example, the post-processing module 156 of translation system 151 can post-process the initial translation.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
    receiving an electronic text message from a client device of a user;
    normalizing the electronic text message to generate a normalized text message comprising characters having a consistent width, the normalizing comprising at least one of:
        converting a full-width character into a half-width character; or
        converting a half-width character into a full-width character;
    tagging at least one phrase in the normalized text message with a marker to generate a tagged text message, the marker indicating that the at least one phrase will be translated using a rule-based system;
    translating the tagged text message using the rule-based system and a machine translation system to generate an initial translation,
        wherein translating the tagged text message comprises (i) translating the at least one phrase using the rule-based system and (ii) translating other words or phrases using the machine translation system, and
        wherein the machine translation system is trained using training data comprising characters having a consistent width; and
    post-processing the initial translation to generate a final translation.

2. The method of claim 1, wherein receiving the electronic text message comprises:
    splitting the electronic text message into discrete sentences.

3. The method of claim 1, wherein normalizing the electronic text message comprises at least one of:
    converting a control character into a space;
    converting a UNICODE space character into an ASCII space character;
    converting a Japanese character with Dakuten or Handakuten from a two-UNICODE point representation to a one-UNICODE point representation;
    replacing an XML related character; or
    replacing a special character utilized by the machine translation system.

4. The method of claim 1, wherein the normalized message comprises characters having a consistent form.

5. The method of claim 1, wherein the marker comprises an XML, marker.

6. The method of claim 1, wherein tagging the at least one phrase comprises tokenizing the normalized text message into discrete words.

7. The method of claim 1, wherein tagging the at least one phrase comprises converting at least one upper case character in the normalized text message to a lower case character.

8. The method of claim 1, wherein the machine translation system comprises a statistical machine translator.

9. The method of claim 1, wherein post-processing the initial translation comprises at least one of:
    detokenizing the initial translation;
    removing the marker from the initial translation; or
    reintroducing into the initial translation a special character used by the machine translation system.

10. A system, comprising:
    one or more computer processors programmed to perform operations comprising:
        receiving an electronic text message from a client device of a user;
        normalizing the electronic text message to generate a normalized text message comprising characters having a consistent width, the normalizing comprising at least one of:
            converting a full-width character into a half-width character; or
            converting a half-width character into a full-width character;
        tagging at least one phrase in the normalized text message with a marker to generate a tagged text message, the marker indicating that the at least one phrase will be translated using a rule-based system;
        translating the tagged text message using the rule-based system and a machine translation system to generate an initial translation,
            wherein translating the tagged text message comprises (i) translating the at least one phrase using the rule-based system and (ii) translating other words or phrases using the machine translation system, and
            wherein the machine translation system is trained using training data comprising characters having a consistent width; and
        post-processing the initial translation to generate a final translation.

11. The system of claim 10, wherein receiving the electronic text message comprises:
    splitting the electronic text message into discrete sentences.

12. The system of claim 10, wherein normalizing the electronic text message comprises at least one of:
- converting a control character into a space;
- converting a UNICODE space character into an ASCII space character;
- converting a Japanese character with Dakuten or Handakuten from a two-UNICODE point representation to a one-UNICODE point representation;
- replacing an XML related character; or
- replacing a special character utilized by the machine translation system.

13. The system of claim 10, wherein the normalized message comprises characters having a consistent form.

14. The system of claim 10, wherein tagging the at least one phrase comprises tokenizing the normalized text message into discrete words.

15. The system of claim 10, wherein tagging the at least one phrase comprises converting at least one upper case character in the normalized text message to a lower case character.

16. The system of claim 10, wherein the machine translation system comprises a statistical machine translator.

17. The system of claim 10, wherein post-processing the initial translation comprises at least one of:
- detokenizing the initial translation;
- removing the marker from the initial translation; or
- reintroducing into the initial translation a special character used by the machine translation system.

18. An article, comprising:
- a non-transitory computer-readable medium having instructions stored thereon that, when executed by one or more computer processors, cause the computer processors to perform operations comprising:
  - receiving an electronic text message from a client device of a user;
  - normalizing the electronic text message to generate a normalized text message comprising characters having a consistent width, the normalizing comprising at least one of:
    - converting a full-width character into a half-width character; or
    - converting a half-width character into a full-width character;
  - tagging at least one phrase in the normalized text message with a marker to generate a tagged text message, the marker indicating that the at least one phrase will be translated using a rule-based system;
  - translating the tagged text message using the rule-based system and a machine translation system to generate an initial translation,
    - wherein translating the tagged text message comprises (i) translating the at least one phrase using the rule-based system and (ii) translating other words or phrases using the machine translation system, and
    - wherein the machine translation system is trained using training data comprising characters having a consistent width; and
  - post-processing the initial translation to generate a final translation.

* * * * *